United States Patent [19]
Werner et al.

[11] Patent Number: 4,967,392
[45] Date of Patent: Oct. 30, 1990

[54] DRAWING PROCESSOR FOR COMPUTER GRAPHIC SYSTEM USING A PLURALITY OF PARALLEL PROCESSORS WHICH EACH HANDLE A GROUP OF DISPLAY SCREEN SCANLINES

[75] Inventors: Ross G. Werner, Woodside, Calif.; Eric L. Ryherd, Brookline, N.H.

[73] Assignee: Alliant Computer Systems Corporation, Littleton, Mass.

[21] Appl. No.: 225,113

[22] Filed: Jul. 27, 1988

[51] Int. Cl.[5] .............................................. G06F 3/153
[52] U.S. Cl. .................................... 364/900; 364/521; 364/920.7; 364/920.8; 364/927.4; 364/931.41
[58] Field of Search ................. 364/900 MS File, 521

[56] References Cited

U.S. PATENT DOCUMENTS

| | | | |
|---|---|---|---|
| 4,203,154 | 5/1980 | Lampson et al. | 364/900 X |
| 4,395,700 | 7/1983 | McCubbrey et al. | 364/900 X |
| 4,454,593 | 6/1984 | Fleming et al. | 364/900 |
| 4,491,932 | 1/1985 | Ruhman et al. | 364/900 |
| 4,606,066 | 8/1986 | Hata et al. | 364/900 X |
| 4,823,286 | 4/1989 | Lumelsky et al. | 364/521 |
| 4,882,683 | 11/1989 | Rupp et al. | 364/521 |

*Primary Examiner*—Thomas M. Heckler
*Attorney, Agent, or Firm*—Hale and Dorr

[57] ABSTRACT

The invention is a method and apparatus primarily for generating pixel representations for the video display of three-dimensional objects projected onto a two-dimensional pixel plane. The scanlines of the pixel plane are associated into N interlaced sets, each set having as members only scanlines having an equivalent vertical pixel location Modulo N. The image memory unit block utilizes both serial and parallel processing. For each color (red, green and blue) and for calculating depths, each image memory unit has a plurality N of Scanline Processors for generating the color or depth data to assign to a given pixel. Each of the Scanline Processors is associated with exactly one of the N sets of scanlines. The image memory units each also include a Master Controller. For certain objects, particularly triangular patches, the Master Controller sets up sequentially each Scanline Processor to render pixels on a specific scanline. As the Scanline Processor is rendered pixels, the Master Controller sets up the next scanline processor, and so on, until the entire patch is rendered. For other constructs, such as non-horizontal vectors, the Master Controller sets up all of the N Scanline Processors simultaneously with all of the data necessary to render the entire vector. Each Scanline Processor determines the location of pixels representing the vector and also calculates data with resepct to each pixel. Each scanline processor only writes to memory that data with respect to pixels of scanlines assigned to the set with which each Scanline Processor is associated.

21 Claims, 9 Drawing Sheets

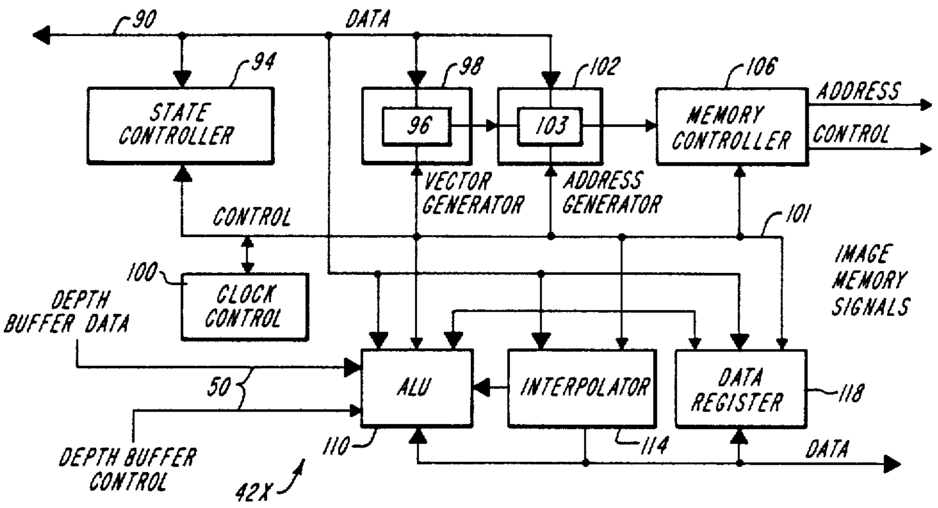
FIG. 5
FIG. 6A
FIG. 6B
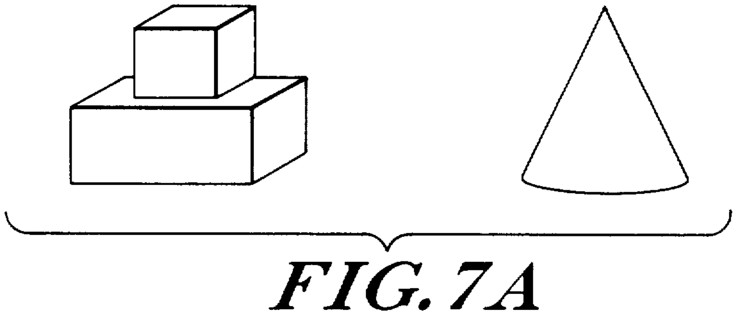
FIG. 7A

DRAWING PROCESSOR FOR COMPUTER GRAPHIC SYSTEM USING A PLURALITY OF PARALLEL PROCESSORS WHICH EACH HANDLE A GROUP OF DISPLAY SCREEN SCANLINES

BACKGROUND OF THE INVENTION

This invention relates generally to the field of computeraided design and graphics. It relates specifically to a drawing processor system using a set of multiple processors processing in parallel, each processor handling a group of designated display screen scanlines.

The co-pending, co-assigned applications entitled "Sequential Access Memory System," U.S. Ser. No. 078,872, filed on July 28, 1987, in the name of Ross G. Werner and Eric L. Ryherd and "Memory Address System," U.S. Ser. No. 078,873, filed on July 28, 1987, in the name of John G. Torborg and Fred K. Oliver disclose systems for storing, addressing and accessing pixel data for the pixels of a raster or other display which are suitable for use with the disclosed invention. These two applications are hereby incorporated herein by reference.

Recently, interactive three-dimensional graphics applications have become a significant portion of computer-aided design techniques. Using interactive graphics applications, an operator manipulates complex models of objects and other graphical representations. Providing realistic rendering and display of the models and performing complex operations upon them require a very large amount of arithmetical processing. For example, it is desirable to depict a complex object, such as an automobile; to rotate an image of the object about an axis; to depict shading of object surfaces based on a light source at any location; to cut a section of the object along any plane and display an image of that cross section; to assign arbitrary colors to portions of the object as determined by independent parameters; and to show a three-dimensional wire frame image of the object.

Further, providing real time interactive rendering requires a commensurately large amount of processing at the pixel level. Current commercially-available graphic systems use a single drawing processor architecture, which calculates and renders a single pixel at a time. The fastest of these systems can calculate and render a new pixel's value approximately every 50 nanoseconds, resulting in a peak performance of 20 million pixels per second. Implementing shading, an increasingly popular feature, significantly degrades performance. When rendering small, shaded triangles of less than 100 pixels in area, typically fewer than 5,000 triangles per second may be rendered. "Depth buffering" is the procedure by which the system omits surfaces of representations of objects that would be hidden by other objects from the viewpoint being rendered at the time. The rendering limit is even lower if depth buffering is also provided. For complex models of more than 5,000 triangles, the performance degrades to the point not suitable for interactive use.

A typical computer graphic system consists of a computer with peripherals, including disc drives, printers, plotters, etc. and a graphics terminal. A typical graphics terminal consists of a high resolution video display screen, user input devices including a keyboard and mouse, an image memory and a drawing processor. The drawing processor accepts high level graphics commands generated by the computer, in part in response to user input, and generates low level commands to control the display at the pixel to pixel level.

A dedicated Graphic Arithmetic Processor (referred to below as a "GAP") may be used to generate a first set of low level commands from the high level commands. The set of low-level commands generated by the GAP generally defines elementary geometric constructs such as vectors, triangles, rectangles, and arrays, each defined by coordinates in three-dimensional space. It is necessary to render each of these three-dimensional geometric shapes as a set of pixels on a two-dimensional cathode ray tube display. The GAP translates the definition of the elementary geometric constructs into pixel representations of selected elements of the constructs, such as vertices of triangular patches and end-points of vectors. The drawing processor generates a full pixel representation from the selected pixel element representation of the elementary geometric constructs.

Several architectures for the drawing processor and image memory controller have been proposed, which use multiple or parallel processing to aehieve higher rendering speeds. See, for instance: Fuchs, H. "Distributing a Visible Surface Algorithm over Multiple Processors," Proceedings (ACM) 1977, Fuchs, H. and Poulton, J., "Pixel-Planes: A VLSI Oriented Design for a Raster Graphics Engine," VLSI Design No. 3 (1981) 20; Fuchs, H., Goldfeather, J., Hultquist, J., "Fast Constructive Solid Geometry Display in the Pixel Powers Graphics System," Computer Graphics (ACM) 20, 4 (1986), 107; Parke, F. I., "Simulations and Expected Performance Analysis of Multiprocessor Z Buffer System," Computer Graphics (ACM) 14, 3 (1980), 48; and Niimi, H., Emai, Y., Murakami, M., Tomita, S., and Hagiwara, H., "A Parallel Processor System for 3-Dimensional Color Graphics," Computer Graphics (ACM) 18, 3 (1984), 67.

An approach proposed by Fuchs (1977) and discussed by Parke (1980) provides a broadcast controller, which distributes polygonal patches to multiple image processors. According to this approach, each image processor renders only those pixels determined by a preset interlace pattern. For example, a two-processor system may be configured with an interlace pattern dependent upon scanline position, so that a first processor renders all pixels on even scanlines and the second processor renders pixels on odd scanlines. According to the proposed model, each processor receives all of the information for every polygon, but only renders those pixels assigned to it by the interlace pattern. Both processors redundantly perform polygon scan conversion and differential calculations, thereby incurring unnecessary overhead and consequently reducing performance.

Smart memory approaches have also been proposed whereby the screen is divided up into blocks of pixels (e.g. an $8\times 8$ block) and a memory chip is provided for each pixel location in the block (e.g. col. 4, row 6). Each such memory chip (64 in this example) has associated with it a processor. See generally Fuchs, (1986) above and Gupta, S., Sproull, R. and Sutherland, I., "A VLSI Architecture for Updating Raster-Scan Displays", Computer Graphics (ACM) 1513 (1981).

In the past, high performance drawing architectures have been designed in which the image memory update bandwidth cannot support the drawing rate. This wastes the high speed of the rendering engine.

OBJECTS OF THE INVENTION

Thus, the several objects of the invention include: to provide a system for high speed rendering of graphic geometric constructs which is cost-effective and reliable; to provide a method and apparatus for high speed rendering of graphic geometric constructs that can write to memory at a speed that matches the high speed of the rendering engine; to provide a method and apparatus for the high speed rendering of geometric constructs that uses both parallel and pipelined processing; to provide a method and an apparatus for very high speed rendering of triangular patches; and to provide a method and an apparatus for very high speed rendering of horizontal, constant color vectors.

BRIEF SUMMARY OF A PREFERRED EMBODIMENT OF THE INVENTION

The system of the invention accomplishes very high speed graphics rendering by providing a plurality of image memory units, each including a bus interface, a drawing processor, image memory RAM, and a video output section. Representations of the graphical constructs are broken down into portions that may be mapped onto sets of scanlines of the video output device. The drawing processors of the image memory units use a multiple processor architecture combining serial (also referred to as "pipelined") and parallel processing. In a preferred embodiment, the drawing processors are made up of five processors. Of these five processors, one is a master controller and the remaining four are identical scanline processors. Each master controller (referred to below as a "Master Controller") and each scanline processor (referred to below as a "Scanline Processor") may, but need not be implemented as a single VLSI device. In fact, the four Scanline Processors and the master controller can be integrated into a single VLSI device. In combination, the Master Controller and the Scanline Processors accept as inputs from the GAP, commands that define elementary geometric constructs with respect to a mathematical coordinate plane and generate as outputs commands that relate to individual pixels of a pixel plane. The Scanline Processors perform the necessary memory address and data calculations to write the appropriate color and depth data into the image memory.

In a preferred embodiment, four Scanline Processors are used, which number is commensurate with the memory configuration used and the system cost goals. Of course, other configurations may be used for higher or lower cost and performance goals. The scanlines are divided into 4 sets. The members of each set all have the same Y location Modulo 4. That is, a first set contains scanlines at 0, 4, 8, 12, 16, etc. A second set contains scanlines 1, 5, 9, 13, 17, etc. Each of the four Scanline Processors only writes to memory data for pixels of the scanlines in one set. The Scanline Processors interface directly with the video image memory RAMs, set up in blocks that make up the frame buffer (the block of memory in which the data for the video display is stored). The blocks may be referred to as "interlaces."No additional logic components are interposed between a Scanline Processor and the image memory, thereby permitting the complete drawing processor to be configured with a minimum number of components.

In the preferred embodiment of the invention, four separate image memory units are provided (each image memory unit having a Master Controller and four Scanline Processors). Three of the four image memory units render pixels in one each of the colors red, green and blue. The fourth performs depth and depth buffering calculations. Depth buffering is also referred to below and in the art as "Z-buffering."

Each of the Master Controllers performs command set up and controls the related Scanline Processors. Further, each of the Master Controllers performs Y address calculations to be used by the Scanline Processors. The Master Controllers make calculations related to position and pass resulting parameters and also pass parameters relating to color or depth values. The Scanline Processors perform the lowest level of calculations for drawing vectors and triangular patches, filling rectangles and moving blocks of pixels. The Scanline Processors perform calculations for determining both position and color and depth values. The Scanline Processors also perform scanline shading calculations, and depth buffering calculations. Finally, the Scanline Processors control the image memory RAMs, including cycle timing, refresh control and video display refresh.

The system of the invention renders triangular patches very efficiently. It renders a triangular patch as sections of scanlines. The Master Controller assigned to render color (as opposed to the Master Controller assigned to do depth calculations), sets up its four Scanline Processors with information regarding the location of vertices of the triangular patch, the color value at those vertices, and functions for the change in color across a scanline and along the edges of the patch. After an initial set up, each of the Scanline Processors are sequentially directed to calculate the color values for all of the pixels in a scanline. Thus, after the Master Controller sets up the first Scanline Processor, the Scanline Processor is active while the Master Controller sets up the second Scanline Processor. While the first and second Scanline Processors ar proceeding across their respective scanlines, calculating color values, the Master Controller sets up the third Scanline Processor, and so on, until the last Scanline Processor is set up and directed to calculate. By the time the last Scanline Processor is calculating color values, the first Scanline Processor has completed its first scanline, and the Master Controller returns to it and sets it up for the next scanline it is to draw.

Thus, the Master Controller works much like a circus juggler, spinning four plates, one each on the end of a stick. He gets them all started spinning, and then respins each one sequentially as it slows down, while the others remain spinning. This provides for efficient operation of the Scanline Processors and the Master Controller, with a minimum amount of idle time for any.

The system also provides for two degrees of precision to locate the position of the edge of the triangular patch on a given scanline. The horizontal (X) location of the edge of the patch is calculated scanline by scanline. The Master Controller receives from the GAP, the X location of one vertex of the triangle and the slope of the edge. The Master Controller calculates the X location of the edge on the first scanline next below the scanline on which the vertex resides, by adding the slope to the X location of the vertex. The location of the edge may be on a whole pixel, but it is more likely that the location will fall between pixels. To calculate the X location of the edge of the patch on the second scanline below the one on which the vertex resides, the system uses as a starting point the X location of the just located edge, and adds the slope to it. It proceeds similarly down along the edge. Different degrees of precision are needed to accomplish two goals: (1) calculating the color (or depth) value for all pixels across the scanline for which the edge has been located; and (2) calculating the X location of the edge on the scanline below the one for which the edge has just been located. The first goal requires less precision. Thus, the system calculates the edge location in a format that allows exploitation of a grosser degree of precision by the Scanline Processors as they calculate the color value for all pixels in the scanline and exploitation of a finer degree of precision by the Master Controller as it calculates the X location of the edge on each succeeding scanline. Thus, the Scanline Processors may function more quickly. The higher precision X locations calculated by the master controller need not be done as quickly. Therefore, a slower and less expensive adder may be used. This allows an optimal tradeoff between precision and speed.

The system processes non-horizontal vectors very efficiently. The Master Controller sets up all Scanline Processors with parameters necessary to determine which pixels will represent a vector, and with a function for determining the color value of pixels that represent the vector. All Scanline Processors begin the process of rendering the vector in step, but soon fall out of step with each other as explained below. Each Scanline Processor applies an identical process to determine the location of the pixel representing the vector next closest to one endpoint. Each Scanline Processor then applies the color function and determines the color value of the pixel. The Scanline Processor retains that color value in a register. Each Scanline Processor then determines whether the pixel, given its Y location, resides on a scanline in the set assigned to that Scanline Processor. If the pixel is not assigned to that Scanline Processor, the Scanline Processor again applies the vector location process to locate the pixel next closest to the one just located and proceeds in like manner. If, however, the pixel is assigned to that Scanline Processor, the Scanline Processor writes the pixel's value to memory. Writing the pixel's value to memory is time consuming. Thus, each Scanline Processor only must write to memory for those pixels on scanlines assigned to it.

The system also processes horizontal constant color vectors very efficiently. The memory is arranged to accommodate "superpixels." A superpixel is a set of pixels of a rectangular block. As an example, the superpixel may be five pixels wide and four pixels high. Data for each pixel in one row of a superpixel is stored in a different memory block, with identical addresses for each pixel within its respective memory block. For example, in the fifteenth superpixel along a scanline, the first pixel will be stored in a first memory block at a memory location defined by two components: a first for its vertical or Y location; and a second for its superpixel membership, in this case, fifteen. The second pixel will be stored in a second memory block at a memory location having an identical address to the first, except for the identification of the memory block. The remaining three pixels are stored at correspondingly similar memory locations.

In the rendering of horizontal vectors, the system takes advantage of the memory address scheme for horizontal vectors having no color variation along their length. Because there is no color variation, once the pixel is identified, it can be written with no further calculation. Similarly, once a superpixel has been identified as representing a part of a horizontal vector, the color value for each pixel in it can be written to memory simultaneously with no further calculation. In rendering horizontal vectors, the system identifies the beginning endpoint of a vector, and writes to memory values for single pixels until the beginning of a superpixel is reached. Then, the system enters a "horizontal mode" and writes to memory the values for complete superpixels, until the system completes the last full superpixel. At that point, the system switches back to single pixel mode and finishes the vector.

The system of the invention is also applicable to the rendering of any graphics and need not be limited to the two-dimensional projections of three-dimensional objects. Further, the system is particularly advantageous with respect to rendering graphics comprising located shapes, where some priority or ranking scheme applies to various locations. The ranking may be thought of as analogous to the third dimension of three-dimensional objects. For instance, a map of the United States might be used to illustrate political party memberships by county. The map could be made up of 2 "layers," red for party 1; blue for party 2. The system would evaluate the "ranking" between the two parties in, e.g., the state of New York, and color New York accordingly.

BRIEF DESCRIPTION OF THE FIGS. OF THE DRAWING

FIG. 1 is a block diagram overview of a parallel processor architecture of the present invention.

FIG. 1*a* shows in block diagram form the components of a display list management module suitable for implementation of the present invention.

Figure 4:
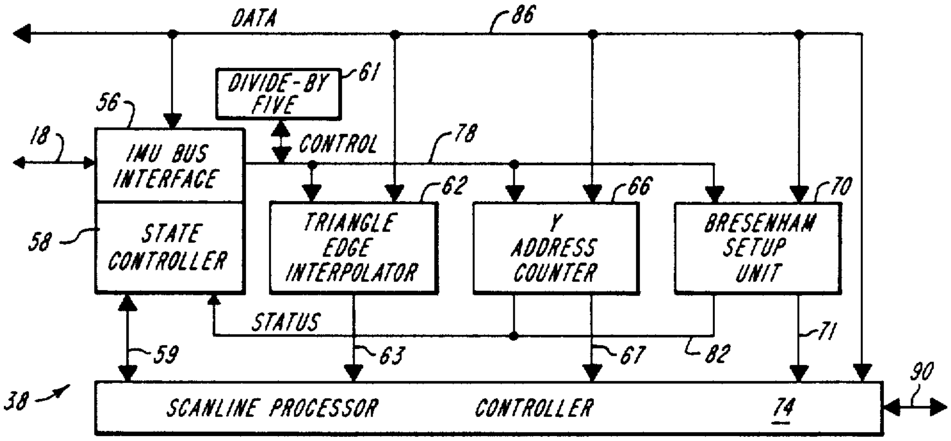
FIG. 4 shows in block diagram form a Master Controller of the invention.
Figure 4A:
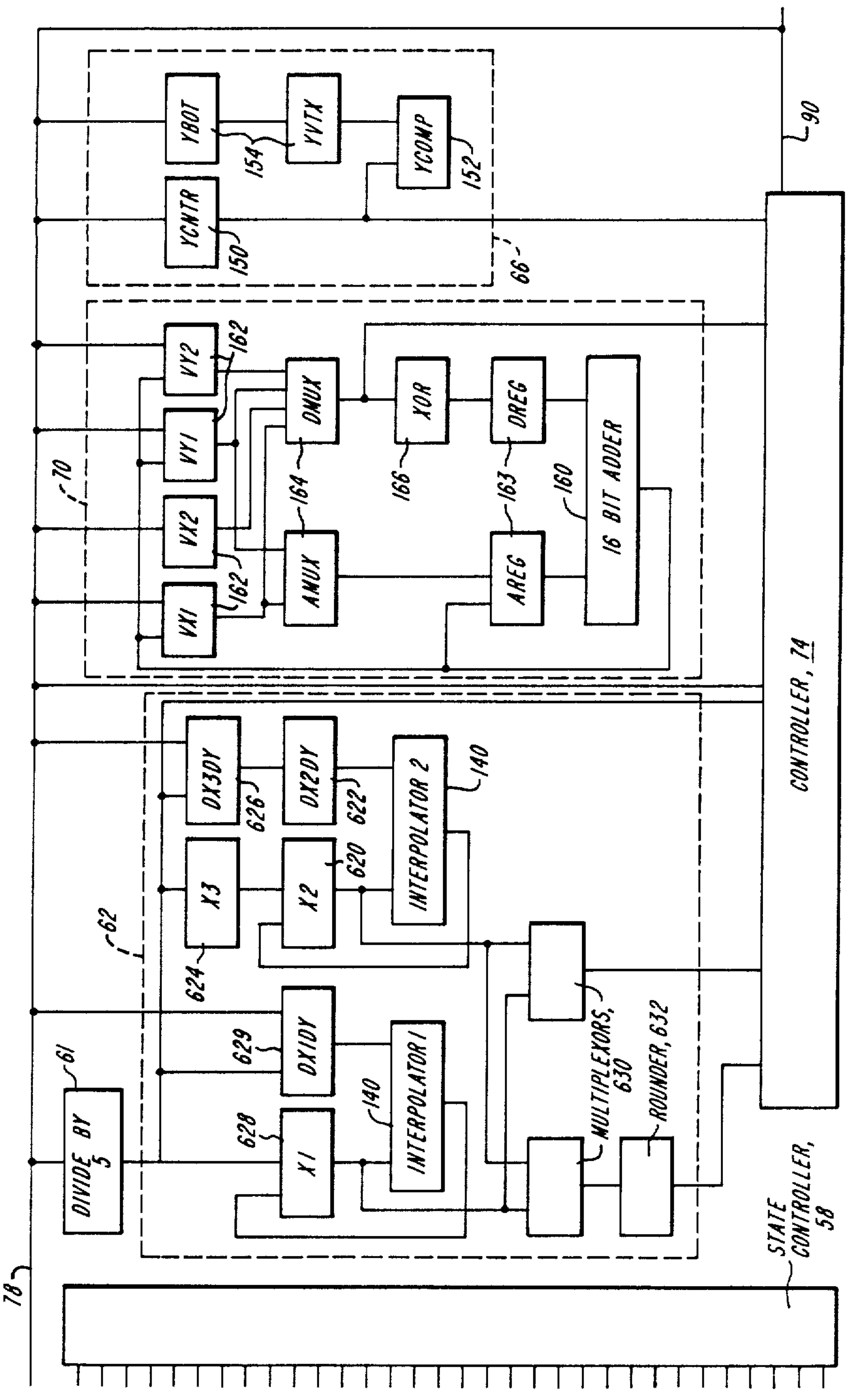

FIG. 4*a* shows in more detailed block diagram form a Master Controller of the invention.

FIG. 5 shows in block diagram form a Scanline Processor of the invention.

FIG. 6 illustrates triangle parameter definitions as used in commands executed by the Master Controller and Scanline Processors of the invention, with FIG. 6*a* showing a "left-facing" triangle and FIG. 6*b* showing a "right-facing" triangle.

FIG. 7*a* shows in schematic form a representation of objects to be manipulated by the invention.

Figure 7B:
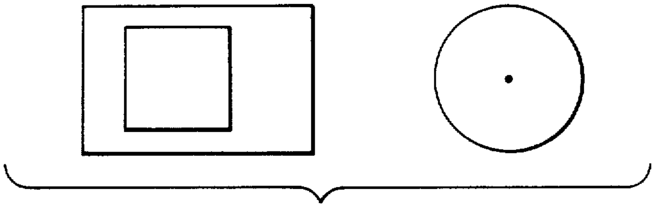

FIG. 7*b* shows in schematic form a representation of the same objects shown in FIG. 7*a*, from a different point of view.

Figure 8A:
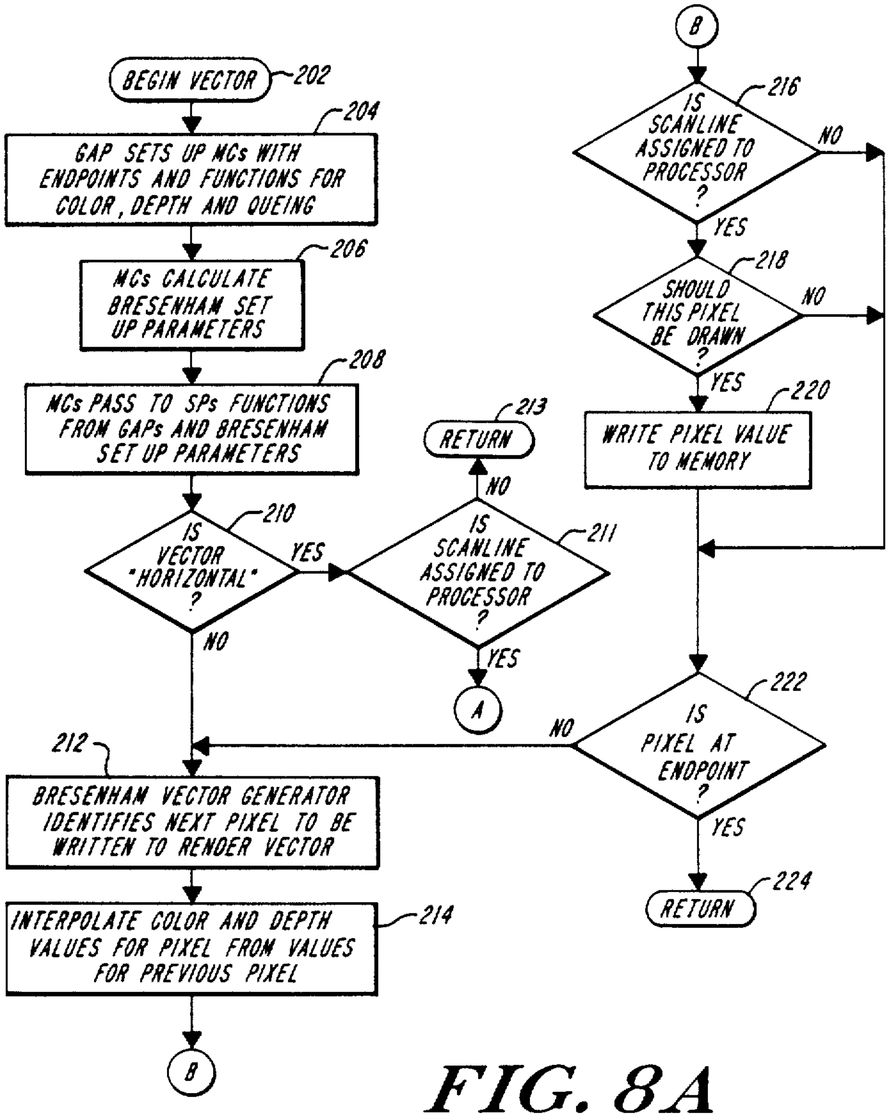
Figure 8B:
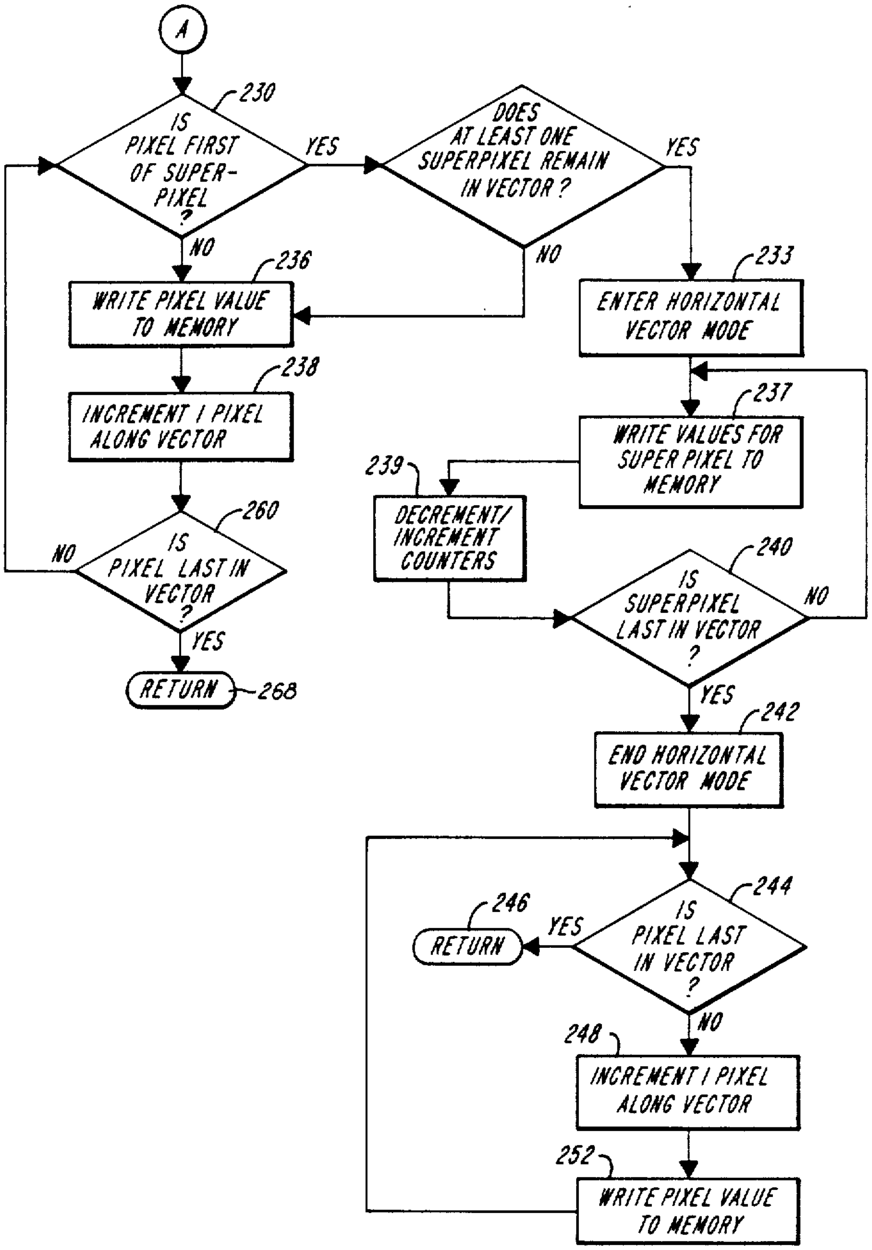

FIG. 8*a* and 8*b* show in flow chart diagram form the means by which the system renders a vector.

Figure 9A:
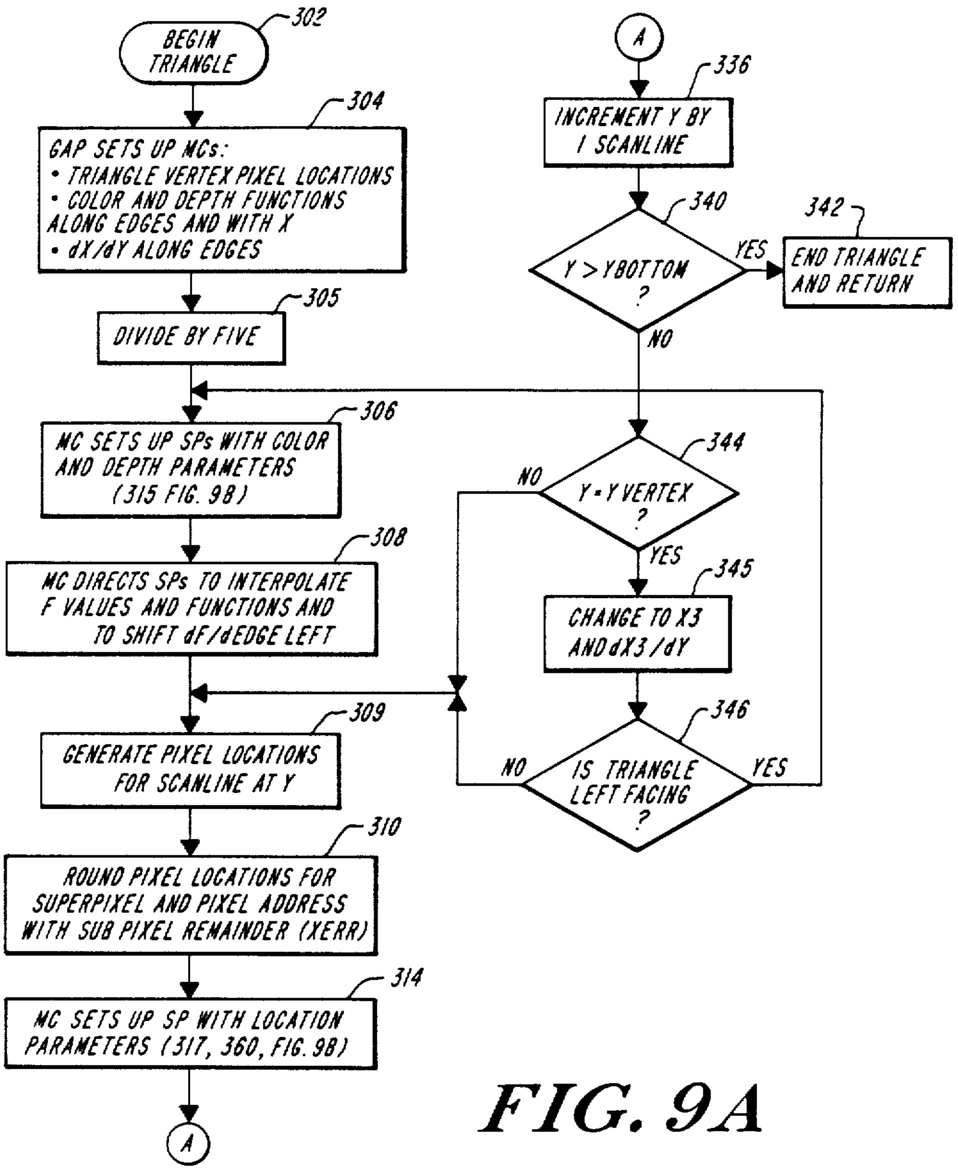
Figure 9B:
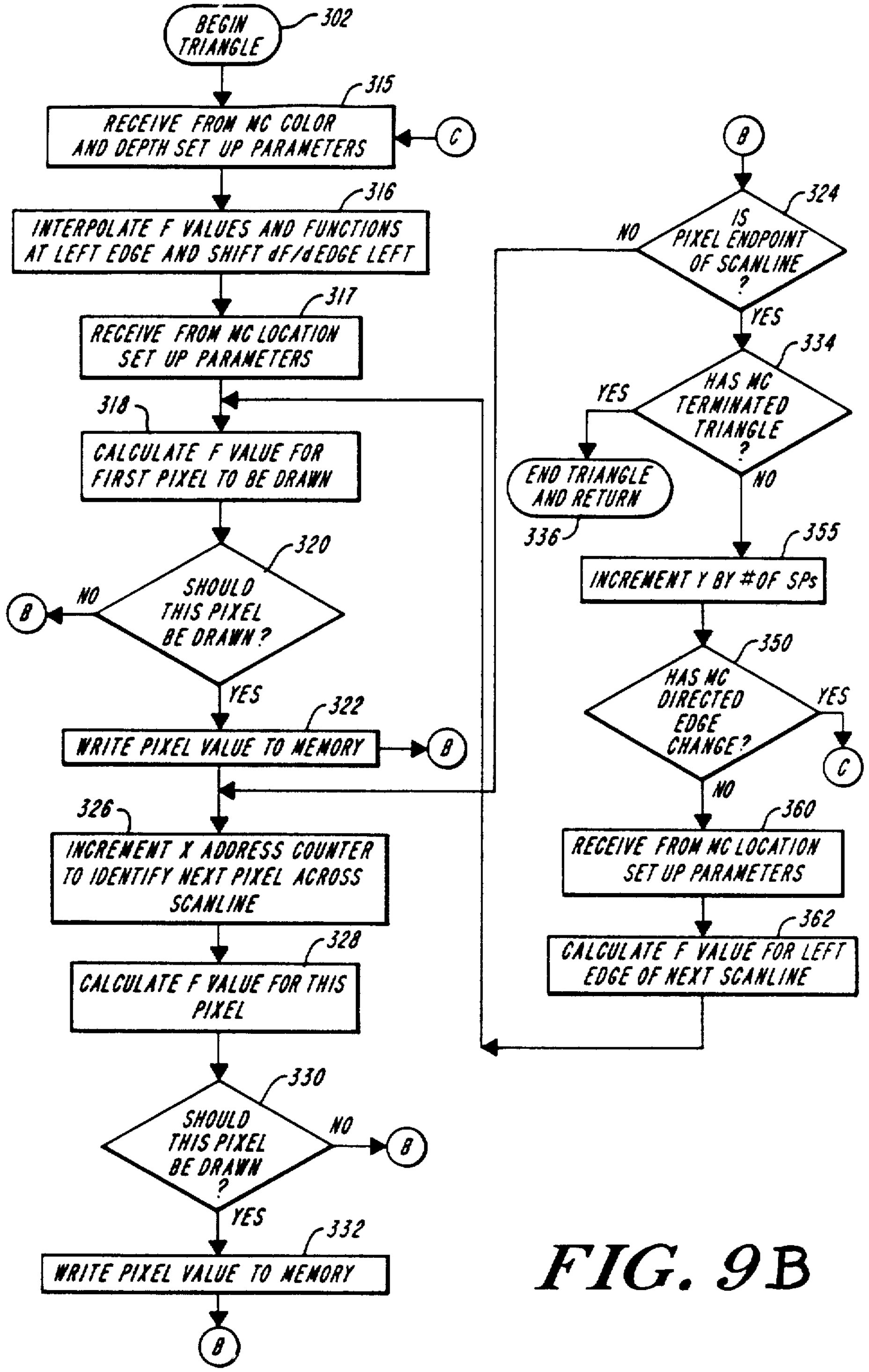

FIG. 9*a* and 9*b* show in flow chart diagram form the means by which the system renders a triangular patch. FIG. 9*a* shows the means by which the Master Controller controls the Scanline Processors to render such a patch. FIG. 9*b* shows the means by which a Scanline Processor renders such a patch under control of the Master Controller.

Figure 10:
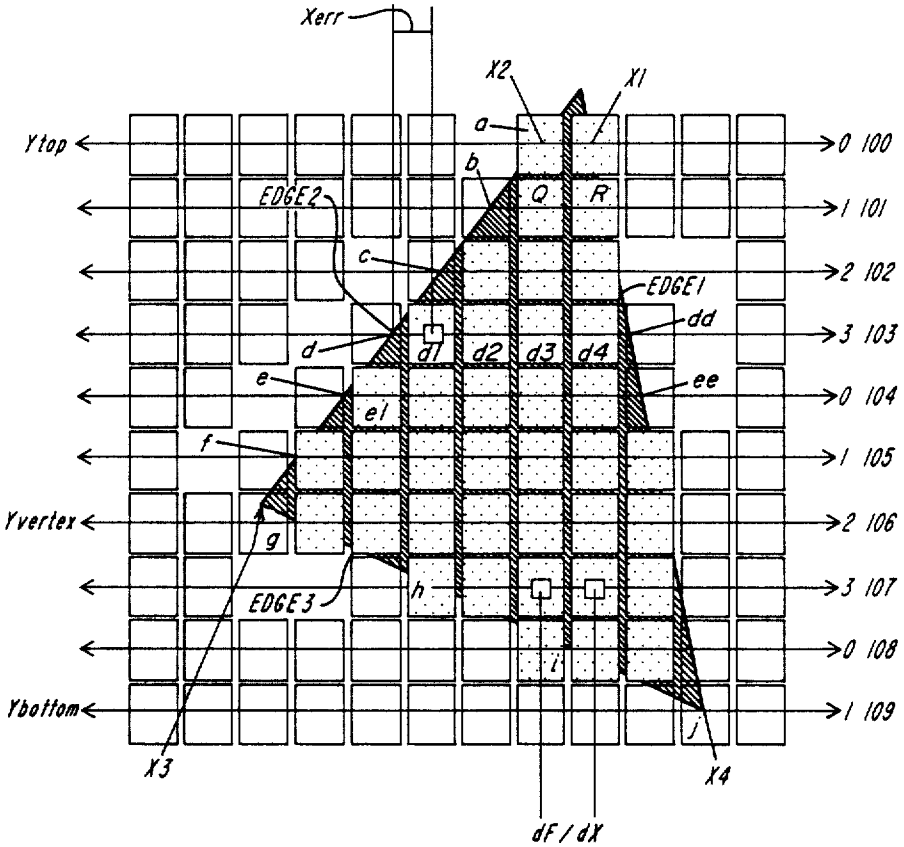

FIG. 10 shows schematically a triangular patch as rendered by the invention.

Figure 11:
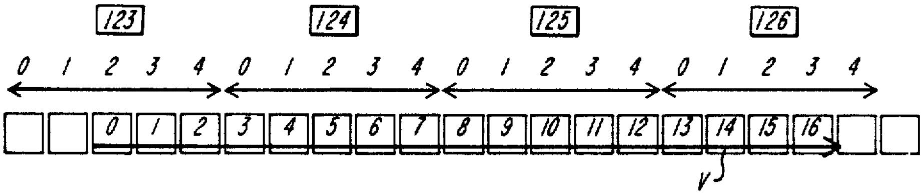

FIG. 11 shows schematically a horizontal vector as rendered by the invention.

DETAILED DESCRIPTION OF A PREFERRED EMBODIMENT OF THE INVENTION

Figure 1:
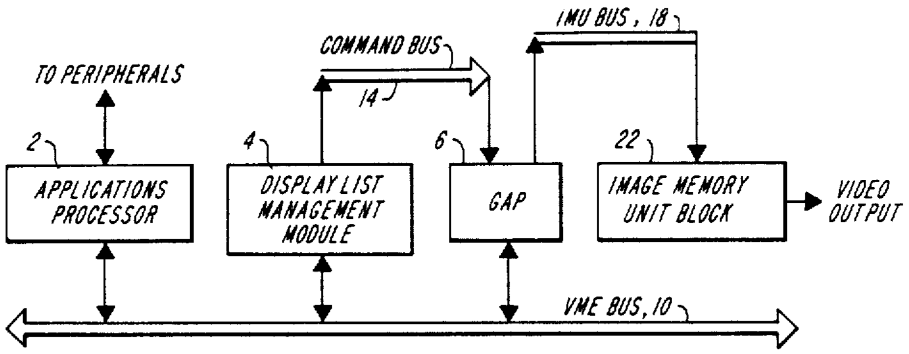
Figure 1A:
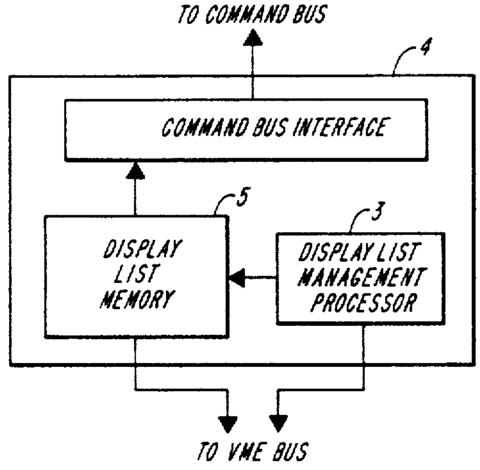

Referring to FIG. 1, an embodiment of a system utilizing the invention is shown. An applications processor 2 controls the entire system, including peripheral devices (not shown) such as disc drives, printers, plotters, and the operator interface, typically a mouse and keyboard combination. The applications processor 2 generates high-level graphics commands. A display list management processor 3, on a display list management module 4 (shown in block diagram in FIG. 1a) executes memory management commands and passes the high level commands to the graphics arithmetic processor ("GAP") 6. The GAP performs the majority of the arithmetic operations necessary to generate and draw the various graphic images called for by the user through the peripherals controlled by the applications processor 2.

The applications processor 2 communicates with the display list management module 4 and the GAP 6 over an industry standard VME bus 10. The display list management module 4 communicates with the GAP 6 over a command bus 14.

The command bus 14 may include a 32 bit data bus. The data bus is unidirectional, all data passing from the display list management module 4 to the GAP 6 and not vice-versa. The GAP is connected through an Image Memory Unit bus ("IMU bus") 18 to an image memory unit block 22, which generates a video output. The image memory unit block 22, detailed in FIG. 2, may include an image memory unit for each color of the display (red, green and blue), and also for depth buffering. The IMU bus is a 32 bit multimaster synchronous bus. The video output signal generates an image on a display screen (not shown) according to known techniques.

The applications processor 2 generates a display list that resides in a display list memory 5 of the display list management module 4. The display list includes graphics commands defining structures, which commands will be transformed into lower level commands executed ultimately by drawing processors of the image memory unit block 22. The high level graphics commands include three basic types.

The first type includes commands that identify and set the parameters for graphics primitives, such as vectors, circles, triangles and text. The primitives are defined relative to their location in a mathematical coordinate system. The primitives fall into broad categories. For instance, curves (which include vectors) constitute one primitive category. Text constitutes another primitive category and polymarkers (stock marker symbols such as circles, stars, bullets, etc.) constitute another category.

The second type of graphics command includes commands that affect the way the GAP will process graphics commands. These commands include those directing a change of coordinate system, or a change of the color of pixels, or a change of the pattern being displayed.

The final type of graphics command includes those which actually affect the structure of the display list stored in memory 5. These commands include those to start or stop accumulation of commands into a structure, or those which refer to another structure resident in the display list memory 5.

As an example of commands that affect the way the GAP will process graphics commands, in response to operator input, the applications processor 2 can generate a display list including structures representing a group of objects such as building blocks sitting on a table — for instance, a cube, a rectangular box and a cone, such as are shown schematically in FIG. 7a. Each structure would have a location relative to a coordinate system, an orientation, a color and perhaps lighting characteristics such as shading and shadows. For example, from one viewing direction, the cube would be on top of the rectangular box, which would be to the left of the cone. A record of these structures would be generated by the applications processor 2 and stored in the display list memory 5. The operator can also view the building blocks from another direction, such as from directly overhead, as shown schematically in FIG. 7b. The operator would communicate this command through the peripheral devices, which command would be translated by the applications processor 2 to graphics commands and passed on to a display list management processor 3 on the display list management module 4. The display list management processor 3 would identify the structures from the display list memory 5 and apply the graphics commands generated by the applications processor 2 to the structures. The calculations necessary to generate the commands to display the building blocks from the new viewing direction would be accomplished by the GAP 6. From the new viewing direction the cube would be in front of the rectangle, which will still be to the left of the cone. The cone, also, would be viewed from the top.

The GAP 6 also generates commands that are sent to the image memory unit block 22 over the IMU bus 18. The GAP 6 generates elementary graphic structure drawing commands representing the group of objects decomposed into shaded triangular patches, vectors and in some cases, pixels, all located in the mathematical coordinate system. Both triangles and vectors may be shaded according to a constant or so-called "flat" function or based on an interpolation between color values for a pair of endpoints. Depending upon the specific application, the interpolation process is often performed by adding a predetermined slope to a value at a point, rather than by strictly interpolating a value between the two end points. (It should be understood that the term "color value" as used below pertains to values for hue, brightness, translucency and saturation.)

The GAP also effects "depth buffering". Depth buffering (also called "Z-buffering") is a means to suppress rendering of objects or portions of objects that are hidden from view by other objects, as seen from a particular viewpoint. The user may specify that the objects rendered be depth buffered. A perspective rendering of three-dimensional objects on a two-dimensional screen is accomplished by projecting each coordinate of the objects along a line between the pertinent point of the object and a point representing an observer and onto a coordinate plane. The projected point is the intersection of the projected line and the plane. Typically (although not necessarily), the plane is between the object and the observer and is perpendicular to the observer's line of sight.

In rendering any particular three dimensional object as a two dimensional object, the mathematical coordinate plane upon which the three dimensional object is projected is mapped onto a pixel plane (the "viewing plane") that may be displayed on a screen or a video display. The display or screen is made up of an array of pixels. Each pixel would be displayed (shown in color, shown black, shown in intensity) according to the characteristics of the point, in the mathematical plane, projected onto the viewing plane at the location of the pixel. For instance, taking the example of the rectangular box, cube and cone illustrated in FIGS. 7*a* and 7*b*, if the rectangular box would be shown to be blue, pixels corresponding to points on the mathmatical plane through which projections of points of the rectangular box pass would be shown as blue in the viewing plane. Further, if the cube were shown to be red, then pixels analogous to points on the cube would be shown red.

It can be understood that from the point of view of FIG. 7*a*, the front faces of the rectangular box and the cube parallel to the paper, may each be shown in their entirety. However, as seen in FIG. 7*b* by an observer above the collection of objects, the red cube would obscure from view some points of the blue box. With respect to that observer, these points of the cube would be in front of the points on the box. It is desirable to show the pixels that are related to points both on the cube and the box, in the color of the cube, namely red.

Depth buffering can be accomplished by keeping track of the distance between the observer and the nearest object point being rendered at a pixel. When rendering a new point that is mapped to the same pixel, the distance between the observer and the new point is determined. If that distance is less than the distance between the observer and an earlier rendered point, the system discards the information required to render the earlier point (e.g., color, intensity, translucency, depth etc.) and stores instead the information necessary to render the later, closer point. If, at a later time, another point is mapped to the same pixel, its distance from the observer will also be calculated. If it is closer than the last rendered point at that pixel, the information for the newest point will be stored. If, on the other hand, it is farther away from the observer than the previously closest point corresponding to that pixel, then the information for the most recent point will be discarded.

It should be noted that the objects need not be viewed from their exterior. A plane can slice the objects, and can slice the objects at any angle. This feature permits showing various cross sections of the set of objects. In that case, when calculating how to render a pixel, the depth Z-buffering system would not render any points of the object located between the slicing plane and the observer.

Figure 2:
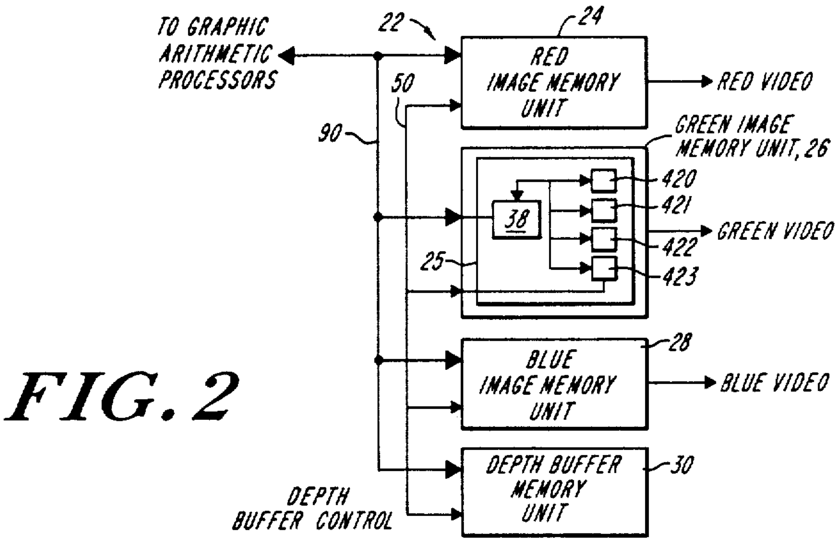
FIG. 2 shows in block diagram form the components of the system for achieving a full color implementation of the present invention.

Turning now to the architecture of the image memory unit block 22, referring to FIG. 2, the image memory unit block 22 includes red, green and blue image memory units 24, 26 and 28 respectively and a depth buffer memory unit 30. A single drawing processor of the image memory unit block 22, for example drawing processor 25 of green image memory unit 26, (FIG. 3) has associated with it image memory interlace RAMs 540, 541, 542 and 43. It should be noted that although FIG. 3 has been designated as representing green image memory unit 26, the image memory unit for red image memory unit 24, blue image memory unit 28 and the depth buffer memory unit 30 are similar in structure. Graphic commands from the GAP 6 are transmitted over IMU bus 18 to a FIFO 34 of the image memory unit 26. The FIFO 34 accumulates commands received by the image memory unit 26 before the image memory unit 26 is ready to execute the commands.

The drawing processor 25 of memory unit 26 (and corresponding processes in units 24, 28 and 30) (shown in relation to image memory unit block 22 in FIG. 2 and in FIG. 3) further includes a Master Controller 38 in communication with a plurality of Scanline Processors 420, 421, 422 and 423. (In the following discussion, reference to an arbitrary one of the Scanline Processors will be denoted by reference numeral "**42*n*".) In the implementation of a preferred embodiment, four Scanline Processors 42*n* are used. Master Controllers 38 associated with red, green or blue image memory units 24, 26, 28 are referred to as "Color Master Controllers". Master Controller 38 associated with depth buffer memory unit 30** is referred to as the "Depth Master Controller."

The number of Scanline Processors **42*n*** depends upon the image memory configuration and cost considerations. Typically a video display is made up of pixels organized in scanlines. A typical video display will have 1,280 pixels across one scanline and 1,024 scanlines from top to bottom. The horizontal direction is nominally denoted the "X" direction. The vertical direction is nominally denoted the "Y" direction. By convention, the origin is in the upper left-hand corner of the screen. The positive X and Y directions are thus to the right and downward respectively.

The GAP 6 transmits commands to the image memory units 24, 26, 28 and 30 relating to the pixels and parameters of graphics primitives, such as points, vectors, triangles and rectangles, along with commands regarding the rendering of the primitives, and designating color, shading, etc. In response to the elementary graphic structure commands generated by the GAP, the system of the invention generates sets of lower level commands directing that values for pixels on certain scanlines be written to memory.

For instance, for a vector, the GAP 6 would determine the locations of the endpoints of the vector in "pixel coordinates." By pixel coordinates, it is meant by coordinates that are relative to pixel locations. For instance, an X pixel coordinate of 220.5 indicates a location half-way between a pixel at X locations 220 and 221. The GAP 6 also generates parameters defining the color and depth along the vector, known respectively as the "color function" and the "depth function." These functions are in the form of differentials of color or depth value between pixels. Within each image memory units, (e.g., unit 24) a Master Controller Bresenham set up unit 70 (FIG. 4, discussed below) generates terms that will be passed to the Scanline Processors **42*n* to enable them to calculate whether or not a given pixel should be written, thereby to render the pixels of the vector. Each Master Controller 38 also passes to the Scanline Processors 42*n*** the color function and depth function to determine the color and depth for each rendered pixel.

The Scanline Processors **42*n* accept the vector set up values and identify each pixel along the vector for which values should be written to memory to render the vector. They also calculate the color value for each pixel based on the color functions passed by the Master Controller 38** for calculating color value differentials.

Figure 3:
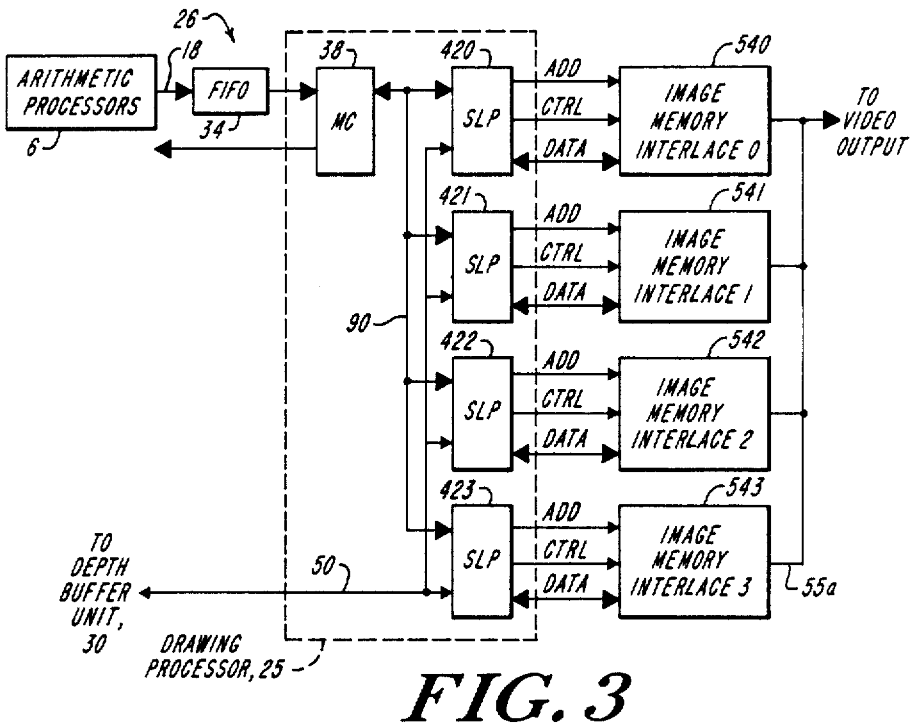
FIG. 3 shows in block diagram form a single image memory unit architecture according to the invention.

Each Scanline Processor **42*n* reads from and writes to a corresponding memory 54*n* with respect to pixels on scanlines stored in the memory 54*n*. The scanlines stored in a memory n are those scanlines whose Y position evaluated modulo ("MOD") the number of Scanline Processors, equal the value of "n". In other words, a system may include four scanline processors 42*n* for each color image memory unit 24, 26, 28 and depth buffer memory unit 30, as illustrated in FIG. 3. The first scanline processor 420, assigned to image memory interlace 540, will execute commands with respect to scanlines having Y positions where Y MOD 4 equals "0", i.e., 0, 4, 8, 12, 16, etc. The next Scanline Processor, 421, assigned to image memory interlace 541, will execute commands with respect to pixels on scanlines having Y positions where Y MOD 4** equals "1", i.e., 1, 5, 9, 13, etc.

The Master Controller 38 communicates with the Scanline Processors 42]n over an IMU local bus 90. The Scanline Processors **42*n* communicate with the depth buffer memory unit 30 over a bus 50; and each Scanline Processor 42*n* communicates with the image memory interlace 54*n*, assigned to the respective Scanline Processor 42*n* as discussed below. The image memory interlaces 54*n* provide a video output over a line 55*a*** to a video display device not shown.

The IMU bus 18 connecting the GAP 6 with the image memory unit block 22 is a synchronous, message-oriented bus. Each message contains a complete image memory unit command. In a preferred implementation, image memory unit commands include a control word, which controls patterning, shading, and depth buffering.

Turning now to the architecture of the Master Controller 38, in a preferred embodiment, the Master Controller 38 is implemented with a 1.5 micron gate array. FIG. 4 shows a block diagram of the configuration of the Master Controller 38.

An IMU bus interface 56 reads commands from the IMU bus 18. A state controller 58 directly controls transfers to and from the IMU bus interface 56. The Master Controller 38 also includes a divide-by-five processor 61, a triangle edge interpolator 62, a Y address counter 66, the Bresenham set up unit 70 and a Scanline Processor controller 74. The state controller 58 sends commands to the triangle edge interpolator 62, Y address counter 66 and Bresenham set up unit 70 over a control bus 78. Status signals from the Y address counter 66 and the Bresenham set up unit 70 may be communicated to the state controller 58 over a status line 82. Each of the triangle interpolator 62, Y address counter 66, Bresenham set up unit 70 and Scanline Processor controller 74 receive data from the IMU bus through IMU Bus Interface 56 via Master Controller data bus 86. Each of the state controller 58, the triangle edge interpolator 62, the Y address counter 66 and the Bresenham set up unit 70 communicate with the Scanline Processor controller 74 over their respective, dedicated communication channels 59, 63, 67 and 71.

The divide-by-five processor 61 (shown in FIGS. 4 and **4*a***) is used in rendering triangular patches and vectors, and is used predominately in calculating the memory address for an initial pixel of a scanline or the beginning of a vector. In the illustrated embodiment, it calculates a "superpixel" address and the pixel offset within a superpixel. (A superpixel is a set of pixels forming a rectangular block, the size of which depends upon the chosen memory configuration. Co-pending applications U.S. Ser. No. 078,872 and 078,873 describe a preferred embodiment of a memory configuration having a 20 pixel superpixel, 5 pixels in the horizontal (X) direction by 4 pixels in the vertical (Y) direction. For a 4 by 5 superpixel, there are 20 memory blocks. In that preferred configuration, data for all pixels corresponding to the same pixel location within a superpixel (e.g. row 2, column 3) is stored in the same designated memory block.)

Further, data for the pixels in one row of a superpixel are stored in different memory blocks, but with the same memory address. To continue the example outlined above, if, for example, the fifteenth superpixel along a scanline, the first pixel will be stored in a first memory block at a location defined by two components: a first for its vertical or Y location; and a second for its superpixel membership, in this case, fifteen. The second pixel will be stored in a second memory block at a memory location having an identical address to the first (except for the identification of the memory block). The remaining three pixels are stored at correspondingly similar memory locations. In the sixteenth superpixel, the first pixel will be stored in the same first memory block as was stored the data for the first pixel of the fifteenth superpixel, but at a different memory location as defined by the first component of its vertical (Y) location and the second component for its superpixel membership.

Referring to FIG. 4, and assuming a 5×4 superpixel structure, the divide-by-five processor 61 receives a pixels' X location, and divides that pixel X location (representing e.g. the horizontal location defining a vertex of a triangular patch, or one endpoint of a vector) by five. The result is an 8 bit binary number and a three bit MOD 5 remainder. The binary part of the result identifies in which superpixel across the horizontal scanline the pixel resides and the remainder part identifies which of the five pixels across the superpixel is being addressed. The Scanline Processors **42*n*** use this divide-by-five value both to identify a memory address and to speed up rendering of geometric constructs, as discussed below. It will be understood that if the superpixel, rather than being five pixels wide is of a different width, for instance, seven pixels wide, then a different size divide-by processor, e.g. a divide-by-seven processor, should be used.

The triangle edge interpolator 62 of the Master Controller 38, shown best in FIG. **4*a*, identifies the pixels that will make up the edges of a triangular patch, using as inputs the locations of the pixels that constitute the triangle vertices. The locations of the vertices are generated and passed by the GAP 6, through interface 56 with a triangle command. The triangle edge interpolator 62 includes two interpolators 140, 141** for calculating the beginning and ending X pixel addresses, respectively, (X being in the horizontal direction) for each scanline of the patch, at which a step in the Y (or vertical) direction occurs. The collection of these pairs of points defines the triangle being mapped.

The triangle edge interpolator 62 identifies the endpoints for the next scanline to be drawn by adding a precalculated slope (different for the two ends of the line) to the endpoints for the preceding scanline. Thus, it "interpolates", however, in a manner that differs from the typical approach for finding an interpolated value between two values on a "curve". The detailed operation of the triangle edge interpolator 62 is described below.

Referring again to FIGS. 4 and **4*a*, the Y address counter 66 is used primarily in the rendering of triangular patches. It includes a counter 150, a comparator 152, and two holding registers 154. The counter 150 is initially set at the Y address of the uppermost vertex (lowest value of Y) of a triangle (shown schematically in FIG. 6). The registers 154 store values for the intermediate and bottom vertices of the triangular patch being processed. As each new scanline is processed, the counter 150 is incremented and the comparator 152 compares the value in the counter 150 with the value in each of the registers 154. When the comparator 152 registers an equality, (which will occur, for instance, at the Y value of the point at vertex X3, as shown in FIG. 6) the Y address counter 66 signals to the state controller 58, which signals to the triangle edge interpolator 62 to change the function (slope) relating change in X to increments in Y (described in more detail below). These functions (slopes) are stored in registers 622, 626 of the triangle edge interpolator 62**.

For instance, as shown in FIG. 6*a*, the initial function relating a change in X to an increment in Y along the edge between X2 and X3 may be that for an increase of 1 in the Y direction (i.e., 1 scanline downward), the change in X will be minus (−) 2 (i.e., 2 pixels to the left, as shown). That change in X with respect to Y of −2 will be stored in register 622. Between X3 and X4, the change in X for an increase of 1 in the Y direction will be plus (+) 2. That change in X (+2) with respect to a one step increment in which Y will be stored in register 626. Correspondingly, the change in X with respect to Y for the third leg of the triangle is stored in a register 629.

The Bresenham setup unit 70 primarily calculates parameters to be used as inputs to a vector drawing process performed by the Scanline Processors **42*n*. The process is the basic Bresenham line drawing process discussed in Bresenham, J., "Algorithm for Computer Control of a Digital Plotter," IBM System Journal, 4,1 (1965), 25. The Bresenham set up unit 70 consists of a 16 bit adder/subtractor 160, four registers 162 for storing X and Y values for the vector endpoints, two accumulater registers 163 for storing intermediate values, multiplexors 164, and control logic 166. The Bresenham set up unit 70** also may be used as a counter to control pixel data read and write transfers and rectangle fill commands.

The Scanline Processor controller 74 includes a two-word FIFO input register (not shown) to allow maximum rate, synchronous transfer of command and pixel data to the Scanline Processors **42*n***.

Turning now to the architecture of a Scanline Processor **42*n*, a block diagram of a Scanline Processor 42*n* is shown at FIG. 5. The Master Controller 38 communicates with the Scanline Processors 42*n* over data bus 90. The Scanline Processor 42*n* can be implemented using a 1.5 micron channeless array. A state controller 94 contains state sequencers (not shown) for all Scanline Processor commands and generates control signals to other components of the Scanline Processor 42*n* to route the data and perform the required operations. The state controller 94 also controls read-write operations to the registers of the Scanline Processor 42*n*, and video display cycles. The Scanline Processor 42*n* further includes a vector generator 98, a clock control 100, an address generator 102, a memory controller 106, an arithmetic logic unit ("ALU") 110, an interpolator 114, and a data register 118. Data and control signals from the depth buffer memory unit 30 are transferred to the Scanline Processors 42*n* of image memory units 24, 26 and 28 over depth buffer data and control lines 50**.

The address generator 102, includes two identical pairs of X and Y up/down counters, called the "source" and "destination" counters. The X source counter is indicated at 103 (FIG. 5). The least significant part of each X counter is, in a preferred embodiment, a MOD 5 five bit shift register for addressing within the 5 pixel wide superpixel. (In a preferred embodiment there are 256 superpixels horizontally across the display screen.) The most significant part of each X counter is an 8 bit binary counter which addresses the superpixel in which the pixel resides. The X counters also have a mode (referred to as "horizontal mode") to freeze the pixel (MOD 5) part and only increment/decrement the superpixel address (binary part). This facilitates a mode for displaying horizontal vectors, generating the memory address for the entire next superpixel in one clock cycle. The X address counter 100 receives information from the state controller 94 and the vector generator 98. It transmits data to the memory controller 106 over control line 101, which communicates with all of the major components of the Scanline Processor **42*n*. (FIG. 5**).

A block of pixels to be moved is specified by opposite corners of a rectangular region. The upper left hand X, Y corner addresses are referred to as the "source block beginning addresses." The addresses at the opposite corner of the block are known as the "source block ending addresses." Latches and comparators are provided for specifying and comparing X and Y source block ending addresses and to reload the X source and X destination counters for performing block move operations. The source counters are used for all drawing or reading operations; the destination counters are used only for block moves.

The vector generator 98, contains a 16 bit adder-accumulator, a 16 bit multiplexor and two 16 bit latches to execute the Bresenham vector generation process. It also contains an 11 bit iteration counter 96 for the Bresenham iteration count. The Bresenham vector generation parameters are calculated by the Master Controller 38 and loaded from the internal data bus for vector commands. The vector generator 98 and its iteration counter 96 are run or halted under control of the state controller 94 and the clock control 100. The vector generator 98 passes data to the X source address counter 103 of the address generator 102.

Turning now to the ALU 110, the ALU contains the elements for performing color (pixel) function and depth function calculations relating to block moves where the representation for a portion of one geometric construct is laid over or under the representation for another portion of a geometric construct. It includes a pixel ALU and a Z or depth function ALU.

The ALU 110 includes a pixel ALU (not shown) which performs arithmetic (Source plus (+) Destination, Source minus (−) Destination, Destination minus (−) Source) operations, or per-bit logical operations using a 4 bit mask. The pixel ALU contains five foreground and one background value latches, a pixel data register, a register for image transfer operations, multiplexors, an 8 bit ALU, and an output register (all not shown). The pixel ALU may be present on the Scanline Processors associated with the depth buffer memory unit 30 (to reduce manufacturing costs), but in that case would not be active.

The ALU 110 also includes a Z function ALU (not shown), which similarly may be present on all Scanline Processors **42*n* but would only be active on the Scanline Processors 42*n* associated with the depth buffer memory unit 30**, and which contains a register for the current Z data, a latch for the Z function, a magnitude comparator, and control logic to determine the result of the Z function. The Z function is "true" if the point of the object mapped to the pixel under examination is closer to the observer than the point of other objects previously mapped to that pixel. Otherwise, it is false. All data paths are 16 bits. The new Z value and the color value will be written if the Z function result is true.

Turning now to the Scanline Processor interpolator 114, the interpolator 114, performs three different "interpolation" functions. (As with the triangle edge interpolator 62 of the Master Controller 38, the interpolator 114 in this illustrated embodiment calculates a value by adding a precalculated slope value to a previous location value.) The three functions are: calculate a new color and depth value for each pixel in an interpolated scanline or along a vector by adding the slope value to the value of the parameter at the previous pixel using an add-accumulate operating path; interpolating a new color or depth value down the left edge of a triangle using an additional add-accumulate operating path; and calculating the color or depth value difference between the mathematical edge of a triangular patch and the first pixel to be written (using fractional pixel information from the Master Controller 38 (see below)) using a shift-and-add multiplier data path.

The clock control 100 includes elements that coordinate the vector generator 98, memory controller 106, and address generator 102. It enables the address generator 102 and starts and stops the vector generator 98 and memory controller 106 when drawing vectors.

Turning now to the commands passed by the GAP 6 to the Master Controllers 38, the commands, discussed below, include register read/write, vector, triangle, scanline, rectangle, point read/write, image read/write and block move.

The GAP 6 generates a register read/write command for directing the Master Controller 38 to load or read from internal registers (not shown) located in the state controller 58, seen best in FIG. 4a. The registers contain data representing drawing and display functions. The internal registers include registers for: pixel functions, write mask, read mask, lookup tables, background value, foreground value, image screen origin, overlay screen origin, depth buffer function, vector pattern (0 and 1) and an area pattern (an $8\times8$ bit register). The registers are set by the GAP, and the state controller 58 of the Master Controller 38 uses the values in connection with the operations discussed below.

The GAP 6 generates a vector command for defining vectors specified as a pair of end points. The vector command generated by the GAP can indicate that the vector will be rendered depth buffered and further that the drawing color will b interpolated to show depth "queuing." With depth queuing, the distance of an object from the observer is indicated by color differences. This color difference is independent of any lighting characteristics that might be shown by the rendering or any other independent parameters shown by color.

The GAP 6 can further generate a triangle command for directing the image memory unit block 22 to render a shaded or depth buffered triangle. The command identifies the coordinates of a triangle's vertices projected onto a two-dimensional image plane. The GAP 6 also generate starting values and differential functions to be used by the image memory unit block 22, which starting values indicate the three colors (red, blue or green) and the depth and which functions indicate the change in either of the three colors and the depth function, along an edge of the defined triangle, and along a scanline that traverses the triangle. Edge and scanline differential functions are calculated by the GAP thereby minimizing the complexity of the image memory units 24, 26, 28, 30.

The GAP 6 can generate a scanline command for directing the image memory unit block 22 to render one or a small number of scanlines. Actually, the scanline constitutes a special case of a triangle command where the triangular representation would include only a few scanlines.

The GAP 6 can generate a rectangle command for directing the image memory unit block 22 to render a filled rectangle as specified by opposite corner points.

The GAP 6 can generate a point read/write command for directing the image memory unit block 22 to render a pixel or to read from memory the rendering of the pixel.

The GAP 6 can generate an image read/write command for similarly directing the image memory unit block 22 to render a pixel array, which array may be any irregular shape. The pixel array is specified to be written to a rectangular region identified by opposite corners. Image reads similarly direct the image memory unit to read from memory the array at the specified location.

The GAP 6 can generate a block move command for directing the image memory unit block 22 to move a rectangular region of pixels from one location to another. The source region is specified by two diagonally opposite addresses. The destination location is specified with a single address, corresponding to one of the corners of the source block. Due to the partitioning of Scanline Processors **42*n* among sets of scanlines, the illustrated apparatus requires the difference between the source and destination region scanline address (in the y direction) must be an integer multiple of the number (in a preferred embodiment four) of Scanline Processors 42*n***.

As has been mentioned above, the GAP 6 generates high level commands that represent the projection of geometric constructs including triangles, vectors, arrays, scanlines, rectangles and pixels, onto a two-dimensional plane mapped to the pixel plane. Each of these commands is accompanied by a control word which includes a function for shading and depth buffering and which also specifies patterning. The Master Controller 38 and the Scanline Processors **42*n*** apply these function values to render the construct with pixels.

Turning now to the method and apparatus by which the system of the Master Controller 38 and the Scanline Processors **42*n*** write pixels with respect to various geometric constructs, the rendering of a vector and a triangular patch will be reviewed. Rendering of these constructs is representative of the operation of the system.

FIGS. **8*a* and 8*b* diagram in flow chart form the method by which the system renders a vector. In rendering a vector, the system uses a combination of pipelined and parallel processing. The Master Controller 38 sets up all of the Scanline Processors 42*n* with the identical information, and then each one, on its own, determines which pixels it must "draw" to represent the vector. The combination may be readily understood with reference to an analogy. A newspaper boy may have a paper route that covers four different streets. He also has a list of all of his customers, organized alphabetically by the last name. In order to speed up his deliveries, he subcontracts with his four younger brothers to split up the route. He gives each one a copy of the customer list and instructs each one to deliver papers to all of the customers on one street. There, the paperboy is analogized to the Master Controller 38 and the younger brothers are analogized to the Scanline Processors 42***n*.

The process begins at 202 with a begin vector command from the applications processor 2. At 204 the GAP 6 sets up the Master Controllers 38 with the pixel coordinates for the vector endpoints and with the functions for rendering color, depth and, if selected depth queuing. The following discussion describes the steps performed by each Master Controller 38 and its associated Scanline Processors 42*n*, unless otherwise noted. At 206 according to the Bresenham process, the Master Controller Bresenham set up unit 70 generates values set out below in response to the input commands from the GAP, indicating a vector having left and right end points at pixel coordinates (X1, Y1) and (X2, Y2) respectively. The Bresenham set up unit calculates the following values:

| | |
|---|---|
| Dx = ABS (X2 − X1) | length of X axis projection |
| Dy = ABS (Y2 − Y1) | length of Y axis projection |
| U = MAX (Dx, Dy) | major axis |
| V = MIN (Dx, Dy) | minor axis |
| Iter = U | iteration count |
| Err = (2 * V) − U | initial value for error accumulator |
| Inc1 = 2 * V | value to add when Err < 0 |
| Inc2 = 2 * (V − U) | value to add when Err > = 0 |
| Xup = SIGN (X2 − X1) | bit to control X count direction |
| Yup = SIGN (Y2 − Y1) | bit to control Y count direction |
| Axis = 0 if Dx > = Dy | bit to select primary counter |
| Axis = 1 if Dx < Dy | |

The Master Controller 38 also inputs the location of the X component of the starting pixel of the vector into its divide-by-five processor 61, which generates a memory address for the starting pixel in the form of an eight bit superpixel X address part and a five bit MOD 5 part which addresses the pixel within the superpixel, as discussed above.

After the Master Controller 38 calculates the foregoing values, at 208 it passes the end-point address, the lengths of the projections, the values Iter, Err, Inc1, Inc2, and the bits for Xup, Yup and Axis to the Scanline Processors 42*n* along with the color or depth information or an interpolation function generated by the GAP 6. The parameters are loaded into registers controlled by the Scanline Processors' 42*n* state controller 94. The Iter value is loaded into the iteration counter 96 of the vector generator 98 and the end-point address is loaded into the X address counter 103. The major axis is the axis (X or Y) on to which the length of the projection of the vector is greatest. For each memory unit, the Master Controller 38 passes the same vector set up information to each of the Scanline Processors 42*n*.

The vector generator 98 of each Scanline Processor 42*n* identifies the pixels that will make up the entire vector and calculates color or depth values for the pixels. However, only values for the pixels of the vector that are on the assigned set of scanlines (every fourth scanline in the preferred embodiment) are written to memory by that particular Scanline Processor 42*n*. This permits each of the four Scanline Processors 42*n* to individually write to memory values for different pixels of each vector at the same time. This parallel functioning minimizes the deleterious effect upon speed caused by the long times required to write values to memory. Vector generation may be as high as 50 million pixels per second for horizontal vectors and as high as 16 million pixels per second for vectors where the absolute value of the slope exceeds 1 (i.e., predominantly vertical vectors). The following discussion describes the steps performed individually by each Scanline Processor 42*n*, unless otherwise indicated.

At 210, the Scanline Processor 42*n* determines if the vector is a horizontal vector, which is treated as a special case. If it is not, the Scanline Processor 42*n* branches to 212. At 212, the Bresenham vector generator 98 loads the values passed by the Master Controller 38. The vector generator 98 is hard wired to perform the comparisons and iterations of the Bresenham process. At the conclusion of one run through the process, the vector generator has chosen between two pixels, as to which one will represent a portion of the vector, and has determined the starting values for the next iteration of the process along the major axis. The iteration counter 96 of vector generator 98 increments along the major axis for each run through the Bresenham process. At 214, the Scanline Processor 42*n* calculates the pixel color value by adding the predetermined slope to the color value of the previous pixel drawn. If the Scanline Processor 42*n* is associated with the Depth Master Controller on depth buffer memory unit 30, it calculates the depth value for the pixel rather than its color value. It also performs a comparison to the depth value currently in memory for that pixel and signals over line 50 (FIG. 2) whether the Scanline Processors associated with the color Master Controllers should write the pixel color values to memory. It also makes the determination with respect to the depth value. At 216, the Scanline Processor 42*n* evaluates the Y coordinate of the pixel representing the vector, and determines whether the pixel is on a scanline assigned to the particular Scanline Processor 42*n*.

If the pixel is one for which the Scanline Processor 42*n* has responsibility, then it branches to 218 and determines if the pixel should be drawn and thus its color value written to memory, based on the depth value as calculated by the depth buffer memory unit 30. If the pixel is to be drawn at 220, the Scanline Processor 42*n* writes that value to memory. If the pixel is not to be drawn, the Scanline Processor 42*n* skips 218 and 220 and branches from 216 to 222 and determines if the pixel just written is a vector end-point. This is indicated by the iteration counter 96 of the vector generator 98 reaching zero, which it does if the last step along the major axis is reached. If so, the Scanline Processor 42*n* returns at 224.

If the pixel is not a vector-end point, the Scanline Processor 42*n* branches from 222 back to 212, identifies the next pixel along the vector and continues until the endpoint of the vector is reached. Similarly if the pixel is written at 220, the Scanline Processor 42*n* continues to 222 to evaluate the endpoint condition, as it does if the pixel was not written due, for example, to depth buffering considerations evaluated at 216 and described above.

At block 216, if the Scanline Processor 42*n* determines that the pixel is not assigned to the Scanline Processor 42*n*, it branches directly to 222, and evaluates if the vector endpoint has been reached, as discussed above. In this manner, each Scanline Processor 42*n* only writes to memory at 220 the color or depth values for pixels it will draw. If the Scanline Processor 42*n* does not draw the pixel, it proceeds to the next pixel along the vector, thus reducing the total time to draw the vector, since each Scanline Processor 42n only performs time consuming write operations (at 220) for approximately one quarter of the pixels in the vector.

At block 210, the system determines if the vector is a special case of a horizontal vector. The special case horizontal vectors are those which are horizontal and for which no color or depth interpolation calculations must be performed on individual pixels and for which no depth buffering is performed. Thus, for each color red, blue and green, the color will be constant along the vector. The color or depth value for these special case horizontal vectors is a constant and is passed by the Master Controller 38 to the Scanline Processor 42n at 208. Horizontal vectors for which color or depth calculations must be performed are processed as described above.

If the vector is horizontal and "special', the system branches to 211. At 211, each Scanline Processor 42n determines if the horizontal vector is on a scanline assigned to it. The determination is made by evaluation of the Y value for a vector endpoint. If the scanline is not assigned to the Scanline Processor 42n, it proceeds to 213 and returns.

If the scanline is assigned to the Scanline Processor 42n, it branches to 230, shown in FIG. 8b.

The iteration counter 96 of the vector generator 98 and the address counter 103 of the address generator 102 act together to step the Scanline Processor 42n across the horizontal vector. The address counter 103 has been loaded with the address of the X location of the left-hand endpoint of the vector in divided-by-five format. The most significant eight bits of the address counter 103 count binary and hold the superpixel portion of the address. The least significant 5 bits are a five bit shift register that counts MOD 5 and holds the address of the pixel within the superpixel. FIG. 11 shows schematically a horizontal vector V, 17 pixels long. The double ended arrows extending above 5 adjacent pixels represent the horizontal extent of individual superpixels #123, #124, #125 and #126. The pixel location (0 through 4) within a superpixel is indicated for each pixel. The vector starts at pixel #2 of superpixel #123 and ends at pixel #3 of superpixel #126. The memory address of the starting pixel may be represented in divided-by-five format by "123.2" and the memory address of the ending pixel may be represented by "126.3".

The iteration counter 96 has been loaded with the length of the vector in a divided-by-five format that represents superpixels and pixels. The most significant eight bits of the iteration counter 96 count binary and hold the superpixel portion of the length. The least significant three bits of the iteration counter holds the pixel portion of the length. Referring to FIG. 11, the horizontal vector that starts at pixel #2 of superpixel #123 and ends at pixel #3 of superpixel #126 has a length of 17 pixels, or three superpixels and two pixels. That length may be represented in divided-by-five format by "3.2".

For the beginning of a horizontal vector, under control of the clock control 100, the Scanline Processor 42n at 230 (FIG. 8b) determines if the pixel is the first pixel of a superpixel by evaluating the least significant five bits of the address counter 103. If not, it branches to 236 and writes the constant color or depth value to memory. The Scanline processor 42n proceeds to 238. The iteration counter 96 of the vector generator 98 is decremented and the X address counter 103 is single stepped representing an increment of one pixel along the vector. After this single step, the address counter 103 in the FIG. 11 embodiment holds the value of "123.3"and the iteration counter holds the value "3.1".

The Scanline Processor 42n continues to 260 and determines if the vector endpoint has been reached. The end of a vector is indicated by both the superpixel part and pixel part of iteration counter 96 holding the value zero. If the vector endpoint has been reached, the Scanline Processor branches to 268 and returns. If not, the Scanline Processor 42n branches to 230 and writes single pixels within a superpixel until the MOD 5 part of the X address counter 103 is zero, which indicates the first pixel of a new superpixel block of five pixels. This will occur after writing values for the third pixel of the vector at location #123.4, as shown in FIG. 11. The following table shows the values of the X address counter 103 and the iteration counter 98 when evaluating the condition at 230. The pixels indicated are shown in FIG. 11. When the counters read as indicated, the corresponding pixel has not yet been written to memory. The immediately preceding pixel has been written to memory.

| Vector Pixel # | Address Counter 103 | Iteration Counter 98 |
|---|---|---|
| 0 | 123.2 | 3.2 |
| 1 | 123.3 | 3.1 |
| 2 | 123.4 | 3.0 |
| 3 | 124.0 | 2.4 |

The Scanline Processor 42n then branches to 231 and determines if at least one entire superpixel remains to be written. This determination is made by testing to verify that the superpixel part of the iteration counter 98 is at least one. If not, the system branches again to 236, writes the color or depth value to memory and continues until the last pixel in the vector is reached and the system returns at 268.

If, at 231, the superpixel part of the iteration counter 98 is at least one, the Scanline Processor 42n branches to 233 and the X address counter 103 and the iteration counter 96 are put into "horizontal mode". At 237, the Scanline Processor 42n simultaneously writes the appropriate value of the color (or depth) of each pixel of the superpixel to memory. The Scanline Processor 42n continues to 239. The superpixel (most significant) part of the iteration counter decreases by 1 while the pixel part remains constant. Thus, the iteration counter 98 holds the value "1.4". The superpixel part of the X address counter 103 also is incremented while the pixel part stays constant. Thus, the address counter 103 holds the value "125.0". This allows values for 5 pixels to be written in a single memory cycle. At 240, the Scanline Processor 42n evaluates the iteration counter to determine if the last full superpixel representing the vector has been written, which is indicated by the superpixel part of the iteration counter being zero. If not, the Scanline Processor 42n branches to 237 and again performs the steps discussed above. The following table shows the values of the address counter 103 and the iteration counter 96 when evaluating the condition at 240. Values for the superpixel containing the pixels indicated have just been written to memory.

| Vector Pixel(s) # | Address Counter 103 | Iteration Counter 96 |
|---|---|---|
| 3–7 | 125.0 | 1.4 |
| 8–12 | 126.0 | 0.4 |

If at 240 the superpixel part of the iteration counter 96 reaches zero (signifying that the last pixels to be written, if any, are all in the next superpixel) the clock controller 100 switches the iteration counter 96 and X address counter 103 out of horizontal vector mode and back to single pixel mode at 242 and finishes the vector. This will occur after the entire superpixel #125 has been written.

At 244, the vector generator 98 determines if the vector endpoint has been reached, and if so, returns at 246. The end of the vector is indicated, as above, by both the superpixel part and the pixel part of the iteration counter 96 holding the value zero. If the vector endpoint has not been reached, the Scanline Processor **42*n* branches to 248 and increments one pixel along the vector as at 238. The Scanline Processor 42*n* proceeds to 252 and writes the color or depth value to memory and the Scanline Processor 42*n* continues to 244. The Scanline Processor 42*n* repeats the single pixel evaluation (244, 248, 252) until the last pixel in the vector is reached. The following table shows the values of the address counter 103 and the iteration counter 96 when the Scanline Processor 42*n* evaluates the condition at 244**. The pixel is the pixel just written.

| Vector Pixel # | Address Counter 103 | Iteration Counter 96 |
|---|---|---|
| 12 | 126.0 | 0.4 |
| 13 | 126.1 | 0.3 |
| 14 | 126.2 | 0.2 |
| 15 | 126.3 | 0.1 |
| 16 | 126.4 | 0.0 |

Turning now to the rendering of triangular patches, FIGS. **9*a* and 9*b* diagram in flow chart form the method by which the system renders a triangular patch. FIG. 9*a* shows the method by which the Master Controllers 38 control the Scanline Processors 42*n* and FIG. 9*b* shows the method by which the Scanline Processors 42*n* render the patch, in concert with the Master Controllers 38. Both FIGS. 9*a* and 9*b*** occur in parallel and must both be referred to in the following discussion.

FIG. 10 shows schematically, a triangular patch rendered by pixels. The mathematical location of the triangular patch is indicated by a triangular region in the background filled in with diagonal lines. The pixels that will represent the triangular patch are filled in with a dotted pattern. The pixels that will not represent the patch are not filled in. (Some of the pixels that will not represent the patch, have been removed for clarity.) The Y locations 100–109 of the scanlines are indicated, as well as those values MOD N (MOD 4 in the illustrated embodiment).

The Master Controller 38 and the Scanline Processors **42*n* function serially, in part, and in parallel, in part. The system begins at 302 with a triangle command from the applications processor 2. At 304, the Master Controller 38 receives from the GAP 6, pixel locations for the three vertices of triangular patches projected onto a two dimensional coordinate plane onto which is mapped the pixel plane. In the case where the vertex of the smallest Y value (i.e., the vertex uppermost on the screen) falls between pixels, the data relates to four pixel locations: two for the upper-most vertex and one for each of the remaining two. The Master Controller 38 also receives from the GAP 6** the following values:

| | | |
|---|---|---|
| X1 | dX1/dY | |
| X2 | dX2/dY | |
| X3 | dX3/dY | |
| Ytop | Yvertex | Ybottom |

Ytop is the Y coordinate of the uppermost scanline of the triangle. Ybottom is the Y coordinate of the scanline at the lowermost point of the triangle and Yvertex is the Y coordinate at the scanline of the intermediate vertex of the triangle. X1 and X2 may be easily understood with reference to FIG. 6. X1 is the X pixel location associated with the upper vertex of the edge having the longest projection onto the Y axis. X2 is the uppermost X pixel location of the edge of the triangle that includes Yvertex and does not include Ybottom and X3 is the lowermost X pixel location of the same edge. It may be the case that X1 and X2 are equal, which occurs when the vertex of the triangle falls at an integer pixel location. X1 and X2 are provided as individual pixel coordinates for the cases where the triangle has a horizontal top edge, or the case where the true vertex of the geometric construct falls between display screen pixels, so that the first top scanline that is actually drawn to fill the triangle contains more than one pixel. Referring to FIG. 10, X1 and X2 are, as illustrated, not equal.

dX1/dY and similar terms with respect to X2 and X3 denote the slope in the Y direction with respect to the X location along the edge beginning at X1, X2 or X3, respectively. The edge beginning at X1 is referred to as Edge 1. Edge 2 begins at X2 and ends at X3 and Edge 3 begins at X3 and ends at Ybottom. Note that no X coordinate is actually calculated for the vertex corresponding to Ybottom. For convenience of discussion, however, that coordinate is referred to as "X4."

There are two triangle modes, shown best in FIG. 6: left facing triangles (FIG. **6*a*), and right facing triangles (FIG. 6*b*). A left facing triangle will have Yvertex on the left side of the triangle and Edge 1 on the right side. The triangle illustrated in FIG. 10 is left facing. A right facing triangle will have Yvertex on the right side of the triangle and Edge 1 on the left side. Since the memory is organized with (0,0) at the top left corner (Y increases downward and X increases to the right), if dX2/dY is more positive than dX1/dY, then Edge 1** is the left edge, and vice versa.

For a left facing triangle, the GAP 6 also generates and passes at 304 initial color and depth values at X1 and X3, and color and depth differential functions along the triangle edges and across scanlines.

| Color and Depth at X1 | Differential along Edge 1 | Color and Depth at X3 | Differential along Edge 3 | Differential across Scanline |
|---|---|---|---|---|
| Z1 | dZ1/dEdge | Z3 | dZ3/dEdge | dZ/dX |
| R1 | dR1/dEdge | R3 | dR3/dEdge | dR/dX |
| G1 | dG1/dEdge | G3 | dG3/dEdge | dG/dX |
| B1 | dB1/dEdge | B3 | dB3/dEdge | dB/dX |

Triangular patches are rendered beginning at the left edge (whether the triangle is right facing or left facing). dZ/dX is the change in Z with respect to X as traveling from left to right. It will be understood that although the projection of a triangular patch into two dimensions appears to be two dimensional, the actual object being projected may have a depth aspect to it. In that case, if depth queuing (changing color of the object with respect to the depth) is chosen, it is necessary to know the depth in order to accurately render the color. Similarly, if depth buffering has been chosen, it is necessary to know the depth value in order for the Z buffer memory unit to determine whether or not to direct that the pixel be displayed. Z1 is the depth value, or the value in the Z direction at the left edge on the top scanline. dZ1/dEdge is the change in the depth value along the left edge. For a right facing triangle, dZ1/dEdge is the change in depth value along Edge 1. For a left facing triangle, dZ1/dEdge is the change in depth value along Edge 2. Z3 is the depth value at X3. And dZ3/dEdge indicates the change in Z along the edge from X3 to Y Bottom.

The parameters with respect to R (red), G (green) and B (blue) are identical to those with respect to Z above and will not be discussed in detail here. In the following discussion, the symbol "F" will be used to denote all of the parameters Z, R, G and B, as all are treated the same way.

At 305, the Master Controller 38 divides the left X location passed by the GAP 6 (in a preferred embodiment) by five to yield a location having a binary part and a fractional MOD 5 part. The binary part, in the preferred embodiment, between 1 and 256, identifies the superpixel along the scanline which represents the course location of the left edge. The MOD 5 part identifies which of the five pixels along the superpixel represents the location and thus, the exact location in memory representing the pixel representing the starting location. The divide-by-five operation is time consuming. Therefore, the system performs the divide-by-five operation only six times per triangular patch: on the beginning and ending end-points of the first scanline and on the pixel location at X3 and the differentials dX1/dy, dX2/dy, dX3/dy. From these divided-by-five values, the Master Controller 38 determines addresses of all other locations by counting. In performing arithmetic operations upon values in divided-by-five format, the Master Controller 38 performs binary arithmetic on the superpixel part and MOD 5 arithmetic on the pixel part, with appropriate overflows from each part to the other.

The foregoing initial color or depth parameters F1, dF1/dEdge, F3, dF3/dEdge, dF/dX and Y are passed at 306 by the Master Controller 38 to each of the Scanline Processors **42*n*. Receipt of these parameters at the Scanline Processors 42*n* is indicated at 315 (FIG. 9*b***).

Each Scanline Processor **42*n* must be initialized at 308 with the appropriate and different value of F for the scanline each will render. At 306 the Master Controller 38 loaded every Scanline Processor 42*n* simultaneously with the initial value for F at the mathematical edge of the triangular patch corresponding to X2 (X1 for a right facing triangle). As shown in FIG. 10, this F value will be accurate at point a. At 308 (FIG. 9*a*) the Master Controller 38 individually directs each Scanline Processor 42*n* to run its interpolator 114 0, 1, 2 or 3 times as appropriate so that each Scanline Processor 42*n* has the proper value of F at the mathematical edge for the first scanline assigned to that Scanline Processor. As shown in FIG. 10, these F values will be accurate at points a, b, c and d. The Master Controller 38 (still at 308) instructs the n Scanline Processors 42*n* to shift the value of dF/dEdge left (in a preferred embodiment, two bits multiplying by four) so that each Scanline Processor 42*n* will interpolate to every fourth, in the preferred embodiment, scanline. Execution of these commands by the Scanline Processors 42*n* is indicated at 316 (FIG. 9*b***).

At 309, the Master Controller 38 generates the pixel coordinate end points of the first scanline in the triangle which it will direct a Scanline Processor **42*n* to draw. The scanline will be at Ytop, and Scanline Processor 420**, in this case, will draw it.

Note that for the first scanline to be drawn, the mathematical locations of the two edges have been identified by the GAP 6 and need not be identified by the Master Controller 38, as will be the typical case. They are simply loaded into the registers 628, 629 for X1 and X2 respectively and passed to the Scanline Processor **42*n* (in this case 420) through the multiplexors 630 and the rounder 632 (FIG. 4*a*). For purposes of illustration, the generation at 309 (FIG. 9*a*) of pixel endpoints for the second scanline representing the patch (Scanline #101 in FIG. 10**) will be discussed.

The Master Controller 38 generates a pair of X coordinates by running simultaneously the two edge interpolators 140, 141 of the triangle edge interpolator 62. The interpolators 140, 141 are preferably in 12.15 (i.e. 12 bits · 15 bits) format, using a 12.4 starting value and a 12.4.11 (i.e. 12 bits · 4 bits · 11 bits) differential value, discussed below. The twelve bit part of the starting and intermediate values denotes whole pixel locations. The four bit part denotes fractional pixel locations. This four bit part is necessary to insure that the F value of the pixels drawn is accurate. Use of these four bits is discussed immediately following in connection with block 318 performed by a Scanline Processor **42*n*, shown in FIG. 9*b*. The eleven bits in the differential value permit an additional degree of fractional precision, which allows locating the mathematical edge of the triangular patch on succeeding scanlines even over edges the full height of the screen. Use of these eleven bits is discussed in connection with block 309, performed by the Master Controller 38, shown in FIG. 9*a***.

Registers 628, 629, 620 and 622 of the interpolators 140, 141 have been loaded with X1, and X2 and slopes dX1/dY and dX2/dY respectively. In the interpolators 140, 141, the slopes are added to the X locations to calculate the mathematical location of the edges of the triangle for an advance of one scanline in the Y direction. The interpolators 140, 141 generate X locations in divided-by-five format that will likely fall between pixels. As an example, for scanline #101 of FIG. 10, the left coordinate may fall 0.66 pixels to the left of the center of pixel Q, and the right coordinate may fall 0.3 pixels to the right of pixel R.

It is at this point that the Master Controller 38 uses the added level of precision to locate the next endpoint. Continuing with the example of directing the Scanline Processor 421 to draw the scanline #101 beginning at b, it will be recalled that the interpolator 140 generates values in 12.4.11 format. The most significant twelve bits represent the whole pixel value of the endpoint location. The fifteen least significant bits represent the fractional pixel value of the endpoint location. As has been mentioned above, the value of the location passed to the Scanline Processors **42*n* is in the format of 12.4. This is because the Scanline Processors 42*n*** use the location for two functions. First, to address the memory, and for that, it is only necessary to locate the pixels, which is accomplished by the most significant twelve bits. The second function is to calculate the F value for the pixels, based on a starting F value and a slope. In a preferred embodiment, the F value only is maintained to an eight bit precision. Thus, it is not necessary for the precision of the location to be any greater than four bits with respect to the fractional pixel location.

However, the Master Controller 38 uses the location of the edge for an additional function. It calculates the location of the edge of the triangular patch for each succeeding scanline (e.g. at point b) by adding the slope dX2/dY (or dX1/dY, for a right facing triangle) to the X location of the edge at the preceding scanline, (e.g. at point a). An edge can extend the entire height of the screen, which extends for over 1,000 pixels. A small error incurred for each scanline due to precision on the level of four bits could accumulate into a large error over the entire height of the screen. For this reason, the Master Controller interpolators 140, 141 calculate and store in registers 628, 620 the values for X1, X2 (and X3 if necessary in register 624) with the added precision of 12.4.11, providing fifteen bits for the fractional pixel part of the location. This insures location of the edge with the precision required to accurately place very long edges.

Once calculated, the two X coordinates need to be rounded to whole pixel values so that the Scanline Processor **42*n* can determine which actual pixels define the triangle. Only pixels whose centers lie inside the mathematical patch will be drawn. At 310, the left X coordinate is rounded up by rounder 632 to the nearest whole pixel (Q) and the right X coordinate is rounded down to the nearest whole pixel (R). Multiplexors 630 select between the left and right X coordinate to send to the rounder 632. The rounder 632** rounds the location of the left X edge to arrive at a value having a whole pixel part (in divided-by-five format) and also a fractional pixel part. The fractional part is referred to below as "Xerr." the rounder also truncates the location of the right edge, but the fractional part of the resultant value is not used.

While the interpolation discussed above proceeds, the values for X3 and dX3/dY are loaded into the divide-by-five 61, with the results loaded into registers 624 and 626 respectively. Use of these values is discussed below.

At 314 the Master Controller 38 performs a scanline set up and passes to the appropriate Scanline Processor **42*n* (in this example, Scanline Processor 421) the following location parameters: the divided, rounded left and right X addresses; the subpixel four bit part of the difference between the rounded and unrounded left X coordinate (referred to as "Xerr"); and the Y coordinate. Receipt of these set up location parameters at an individual Scanline Processor, e.g. 421, is indicated at 317** (FIG. 9*b*). In the case of scanline #101, the Master Controller 38 passes this data to Scanline Processor 421.

Once set up, with the location parameters for a given scanline, an individual Scanline Processor **42*n* calculates the pixel and depth data, across a scanline, and also performs memory addressing calculations. The operation of a Scanline Processor 42*n*** is shown in FIG. 9*b*. As an illustration, the operation of Scanline Processor 423, assigned to scanlines having a MOD 4 reminder value of 3, will be discussed.

As has been mentioned above, the scanline drawing process begins at 302. At 315, the Scanline Processor 423, receive from its Master Controller 38 the color or depth set up parameters, depending on whether the Master Controller 38 is a Color Master Controller associated with red, green or blue image memory units 24, 26, 28, or the Depth Master Controller associated with depth image memory unit 30. These values pertain to the edge of the triangle at location a and include F1, dF1/dEdge and dF/dX. At 316, the Master Controller 38 directed the Scanline Processor 423 to run its interpolator 114 three times, to arrive at the F value at the left edge point d (Scanline #103). (Later the Scanline Processor 423 will shift the value for dF1/dEdge left two bits, resulting in a multiplication by four, to enable it to interpolate F to the value appropriate for the edge at the next scanline (four scanlines lower) assigned to it). At 317, the Scanline Processor 423 received from the Master Controller the location parameters, which include the divided, rounded left X address for the first full pixel inside the patch near point d, the divided, rounded right X address for the last full pixel inside the patch near point dd, Xerr, as indicated, and the Y coordinate (in this case, Y =103). The Scanline Processor 423 loads the left X address into the X address counter 103 of the address generator 102, and loads the right X address into a register, for comparison at a later time to the value then in the X address counter 103.

At 318, the Scanline Processor 423 calculates the starting value of F for the first pixel d1 to be drawn (which differs from the value F that was calculated at 316 for the mathematical edge d of the triangle). The interpolator 114 uses a shift and add multiplier data path. The interpolator 114 calculates (Xerr * dF/dX) and adds that value to the value for F at d. This ensures that the value of F that is written at the starting pixel is the true value at that pixel and not the value calculated at the mathematical edge d, since the rounded X coordinate may be as much as 15/16s of a pixel away from the edge. This will prevent edge inconsistencies present on some depth buffered images generated on other graphics systems. The initial F value is expressed in 8 bits. After application of Xerr * dF/dX bits, the F value for the first pixel to be rendered is expressed in 12.15 format. The fractional 0.15 part of the calculated F value is used to maintain F value accuracy across the full width of the screen. The display and memory buffers which hold F are only 8 bits, and thus the actual F value rendering will be only to 8 bit integer accuracy. The 0.15 part is used as part of the value to which the slope dF/dX is applied, but it is not permanently stored as part of the image data.

The Scanline Processor 423 at 320 evaluates whether the pixel ought to be drawn, in light of several conditions. Since it is possible that the rounding and truncating performed by the Master Controller 38 will result in the left X address being greater than the right X address, the Scanline Processor 423 checks for that case and if it exists, it does not draw any pixels. At 320, the Scanline Processor 423 also evaluates the depth buffering conditions in light of signals generated by the Scanline Processor 423 on the depth buffer memory unit 30. At 322, if appropriate, the Scanline Processor 423 writes the pixel value F to memory. If not, it branches to 324 and evaluates if the pixel is the endpoint of the scanline. This evaluation is performed by comparing the value in the X address counter 103 of the address generator 102 to the value stored in the register of the rounded X right pixel coordinate. The Scanline Processor 423 also branches to 324 from 322 after writing a pixel F value to memory. (Note that the rounded and truncated endpoints may be equal signifying a scanline only one pixel wide).

If at 324 the system determines the pixel is not the scanline endpoint, it branches to 326, increments the X counter 103 and identifies the next pixel along the scanline e.g. d2 (FIG. 10). At 328, the Scanline Processor 423 interpolates F for the pixel to be drawn d2 by using an add accumulate path of interpolator 114. Interpolator 114 adds dF/dX to a temporary copy of F stored in one of its registers. At 330 the Scanline Processor 423 evaluates the depth buffering conditions and, if no pixel is to be drawn, branches again to 324. If a pixel is to be drawn, the Scanline Processor 423 branches to 332 and writes that value to memory. After writing the pixel, the Scanline Processor 423 branches to 324 and evaluates whether the pixel just drawn was the endpoint of the scanline.

If at 324, the Scanline Processor **42*n* determines the pixel is the scanline endpoint (e.g. d4 (FIG. 10)), the Scanline Processor 423 branches to 334 and determines if the Master Controller 38 has indicated the triangle is completed (see below) and has issued a termination command. If the triangle is completed, the Scanline Processor 423 branches to 336 and ends the triangle and returns. If the triangle is not completed, the Scanline Processor 423 branches to 335 and increments the Y counter by the number of Scanline Processors (in a preferred embodiment, four). Before following the manner in which the Scanline Processor 423 moves on to the next scanline, it is necessary to return to the operation of the Master Controller 38**.

As shown in FIG. **9*a*, at 314 the Master Controller has set up a Scanline Processor 42*n* with the location parameters discussed above. While each Scanline Processor 42*n* is conducting the steps discussed above for the first Scanline it draws, the Master Controller 38, like the circus plate spinner, has begun to set up the next scanline. At 336, the Master Controller 38 increments its Y address counter 66** by one.

The Y address counter 66 is used at 340 to effect a comparison between the current Y value and the value "Ybottom". If Y is greater than Ybottom then Ybottom has been reached and the last scanline in the triangle has been rendered. The Master Controller 38 then branches to 342, ends the triangle and returns. If Ybottom is not reached, the Master Controller 38 branches to 344, where a comparison is performed between the current Y value stored in the Y address counter 66 and the Y value for X3, called "Yvertex".

For instance, with reference to FIG. 10, when the Master Controller 38 has incremented its Y address counter 66 to scanline #104, to direct Scanline Processor 420 to draw the scanline beginning at e, Y is less than Ybottom and Y is not yet equal to Yvertex.

If Yvertex has not been reached, the Master Controller branches back to 309. At 309 (FIG. **9*a*), the Master Controller 38 generates the pixel locations for the endpoints of the scanline it is directing the Scanline Processor 42*n* to draw in the same manner as it calculated the endpoints for scanline #101, above. The Master Controller 38 continues through steps 310, 314**, etc., as discussed above.

At block 344 (FIG. **9*a*), if Y equals Yvertex, then Yvertex has been reached, such as at scanline #106, and the Master Controller 38 branches to 345. At 345, the Master Controller replaces the values for X2 and dX2/dY in registers 620 and 622 respectively, with the values for X3 and dX3/dY from registers 624 and 626, respectively. The Master Controller continues to 346 and determines if the triangle is left facing. If Y does not equal Yvertex, the Master Controller 38 branches from 344 to 309 to determine the pixel locations of the X positions along Edge 1 and Edge 3 for scanlines below Yvertex. Thus, the Master Controller 38 identifies the pixel locations for the end points of the next scanline in the same manner as discussed above. At 310, the Master Controller 38 rounds the pixel locations for the endpoints. At 314 the Master Controller 38 passes the location parameters to the appropriate Scanline Processor 42*n* which receives the values, as indicated at 317 (FIG. 9*b***) and proceeds as discussed above with respect to scanlines above Yvertex.

At 346, in the case of a left facing triangle (as is the case shown in FIG. 10), the Master Controller 38 branches to 306. The Master Controller 38 begins to use dX3/dY, rather than dX2/dY, to determine the pixel location of the X position along the edge below Yvertex. The Master Controller 38 again sets up all N of the Scanline Processors **42*n* with the F value at X3, and dF3/dEdge, in a manner the same as the initial set up of the Scanline Processors 42*n*. Similarly, at 308, the Master Controller 38 directs each Scanline Processor 42*n* individually to run its interpolater 114 the appropriate number of times to arrive at F of the edge at the scanline assigned to the Scanline Processor 42*n***.

For instance, with reference to FIG. 10, the Master Controller 38 will direct Scanline processor 422 to run its interpolator zero times; Scanline Processor 423 to run its interpolator one time; Scanline Processor 424 — two times; and Scanline Processor 420 — three times. The Master Controller 38 also at 308 directs the Scanline Processors **42*n*** to shift the F value left two bits, multiplying it by four, as above.

At 350 (FIG. **9*b*), if the Master Controller 38 has directed that the Scanline Processors 42*n* change the edge values, the Scanline Processor 42*n* branches back to 315, and it will again receive from the Master Controller 38 the color and depth set up parameters, and will proceed through the steps indicated, as discussed above. From this point onward, however, it will use F3 and dF3/dEdge rather than F1 and dF1/Edge. This process continues until Ybottom is reached and the Master Controller returns at 342 and the Scanline Processors 42*n* return at 336**.

At 350 (FIG. **9*b*), if the Scanline Processor 420 determines that the Master Controller 38 has not directed the Scanline Processor 420 to change its value for dF/dEdge (for instance for Scanline Processor 420 and Scanline #104), it proceeds to 360 and receives from the Master Controller 38 the rounded, divided X location at the left edge e and right edge ee, and Xerr, passed at 314 (FIG. 9*a*). At 362 (FIG. 9*b*) the Scanline Processor 420 calculates the F value at the mathematical edge e, by activating the data path through interpolator 114 dedicated to that task and by adding dF1/dEdge to the F previously calculated at the edge four scanlines above, e.g. at a on scanline #100. The Scanline Processor 420 proceeds to 318 to calculate the F value for the first pixel of that scanline to be drawn, el, as discussed above with respect to Scanline Processor 421** and pixel d1.

If, at 346, the Master Controller 38 determines that the triangle is not left facing, it branches to 309 and generates the pixel locations for the scanline at the next increment in Y. It does not again set up the Scanline Processors **42*n* with color and depth parameters for marching along Edge 3, because the system continues marching along Edge 1, using the values for Edge 1**.

Thus, for a right facing triangle, the dF3/d Edge values are not needed and are disregarded.

The Master Controllers 38 on the depth-buffer 30 and the Red, Green and Blue image memory units 24, 26, 28 are all performing the same setup operations on the triangular patch at the same time, and loading the Scanline Processors **42*n* with the same X and Y scanline information. Each Master Controller 38 also sends the proper color or depth information to the Scanline Processors 42*n* it controls. The Scanline Processors 42*n* on the depth-buffer memory unit 30 interpolate the Z value, and perform the Z comparison while the Scanline Processors 42*n* on the Red, Green and Blue image memory units 24, 26 and 28 are interpolating the color data for the same pixels. The Scanline Processors 42*n* on the depth-buffer memory unit 30 inhibit the corresponding Scanline Processors 42*n* on the image memory units 24, 26 and 28** from writing the F value depending on the result of the Z comparison.

Triangles of only one or two interpolated scanlines may be rendered as a special case of triangle, with a reduced number or parameters, i.e. X1, X2, Y, F and dF/dX. This reduction results in reduced bus traffic.

As is evident from the foregoing discussion, the drawing procedure for triangular patches differs from that for vectors, not only in detail, but also in kind. With the vectors, the Master Controller 38 sets up its N Scanline Processors **42*n*, and they proceed, on their own, to make the calculations necessary to locate pixels and to generate pixel data. The Scanline Processors 42*n* themselves determine if the pixels are in a set assigned to the Scanline Processor. In the case of a triangular patch, the Master Controller 38 only sets up an individual Scanline Processor 42*n* with the information necessary to render pixels on scanlines assigned to it. The Scanline Processor 42*n*** does not determine if the pixels for which it is making calculations are on a scanline assigned to it.

The foregoing description is by way of illustration only and should not be considered limiting in any sense. The system of the invention is also capable of rendering single scan lines and pixels and block moves. It is also advantageously used to render any sorts of graphics and particularly where each pixel may represent more than one value, when the represented values are subject to ranking. Having described the invention.

What is claimed is:

1. In an apparatus for generating and storing pixel representations for the display of graphic data in a two-dimensional pixel plane defined by a plurality of contiguous, parallel display scanlines, each of which includes a plurality of contiguous pixels, having means for providing instructions in the form of a first sequence of commands which define representations of said graphic data in a coordinate plane;

an image memory unit block for receiving said commands and for controlling a random access image memory into which pixel display data is written, wherein the scanlines are associated into N sets, where N is at least one, said image memory unit block having at least one image memory unit, the invention comprising each said image memory unit having a serial and parallel data processing architecture comprising:

a. N first data processing means configured for parallel processing, each data processing means generating pixel data for pixels associated with those scanlines included in one only of said N sets of scanlines;

b. a second data processing means in a series configuration with the first data processing means and including:

i. means for receiving commands of the first sequence; and ii. a controller:

(1) for generating commands of a second sequence identifying parameters relating to locations on said pixel plane corresponding to located shapes defined by said first sequence of commands;

(2) for passing to said first data processors of the image unit said parameters relating to pixel plane locations; and (3) for passing to said first processors of the image unit commands of the second sequence, relating to color characteristics of said located shapes; and c. each said N first data processors of an image memory unit comprising:

i. means for receiving as inputs the location parameter commands of the second sequence and means for generating pixel locations as outputs;

ii. means for generating memory addresses corresponding to selected pixel locations;

iii. means for receiving as inputs commands of the second sequence relating to color characteristics of said located shapes and generating pixel data as outputs; and iv. means for writing the pixel data to the random access image memory at memory addresses generated by said address generator; and wherein each of the N first data processors writes to memory pixel data only with respect to pixels on a scanline in the set associated with each said first data processor.

2. The apparatus of claim 1, said at least one image memory unit further comprising at least two image memory units:

a. said second data processor of one of said at least two image memory units (designated as the "Ranking Processor") comprising means for passing to the N first data processors as commands of the second sequence, commands indicating ranking characteristics of said located shapes in the form of a starting value and a slope and wherein the second data processors of the remaining of said at least two image memory units (designated as the "Color Processors") comprise means for passing to the N first data processors as commands of the second sequence, commands indicating color characteristics of said located shapes in the form of a starting value and a slope;

b. each said N first data processors associated with each second data processors further comprising means for receiving as inputs said commands of the second sequence relating to ranking characteristics of said located shapes;

c. wherein each Nth first data processor corresponds to each other Nth first data processor associated with the set of scanlines with which said Nth first data processor is associated; and d. wherein each Nth first date processor associated with said Ranking Processor further comprises means for evaluating the ranking characteristic of a given pixel based on the instructions from the operator and generating commands to the corresponding Nth first data processor associated with the Color Processors indicating if it is consistent with the operator's instructions to write the pixel data to memory.

3. The apparatus of claim 2 wherein the number of said remaining at least two image memory units is three, and each generates data with respect to one of the colors red, green and 4. The apparatus of claim 2, wherein the means for generating commands of the second sequence identifying location parameters comprises:

a. connected to said state controller means for selectively incrementing and decrementing a value generated as part of the first sequence of commands representative of position on the coordinate plane and means for comparing the position value to a control value generated as part of the second sequence of commands (said means for incrementing and decrementing and comparing designated an "address counter") and means for passing the incremented and decremented value to the N first data processors; and b. connected to said state controller means for interpolating the location of a point on a triangle edge of said located shapes represented by commands of said first sequence from a starting point and a slope, to generate as commands of the second sequence the location of said second point on the edge (designated a "triangle edge interpolator") and means for passing the interpolated location to the N first data processors.

5. The apparatus of claim 4, wherein the means for generating commands of the second sequence identifying location parameters further comprises, connected to said state controller, means for generating parameters necessary to perform a Bresenham pixel identification and vector generation process based on parameters generated as part of the first sequence of commands (said parameter generating means designated a Brensenham set up unit) and means for passing the Bresenham parameters to the N first data processors.

6. The apparatus of claim 5, wherein:

a. said means of said N first data processor for receiving as inputs said location parameters includes means for receiving said Bresenham parameters and said interpolated location;

b. said means of said N first data processors for receiving as inputs said commands relating to said color characteristics includes means for receiving said commands in the form of a starting value and a slope (designated an "interpolater").

7. The apparatus of claim 6, wherein the second data processor further comprises, connected to said state controller, means for generating commands of the second sequence corresponding to selected locations on the coordinate plane rounded up to the next greater and down to the next lower whole pixel locations on the pixel plane and means for generating a command corresponding to the difference between the coordinate plane location and the whole pixel location (the difference designated as "Xerr").

8. The apparatus of claim 7 wherein the located shapes on the pixel plane constitute triangular patches defined by portions of scanlines and the first sequence of commands include the locations of the vertices of the triangular patch on the coordinate plane and pixel data for selected elements of the triangular patch and functions relating the change in pixel data to the change in position on the coordinate plane parallel to the scanlines of the pixel plane wherein the second data processor further comprises, connected to said state controller, means for generating and transmitting to the associated N first data processors commands relating to the whole pixel locations for endpoints of a scanline that defines a portion of a triangular patch and Xerr and said pixel data for selected elements of the triangular patch and functions relating the change in pixel data to the change in position o the coordinate plane parallel to the scanlines of the pixel plane; and said N first data processors further comprise means for generating the pixel data for pixels at the endpoints of the portion of the scanlines that define the triangular patches by applying the change in the pixel data along the scanline to the pixel data at a selected vertex in light of the difference Xerr.

9. The apparatus of claim 5 wherein the triangle edge interpolator further comprises means for generating a point location in a format defining a subpixel location to a first selected degree of accuracy and to a second selected, finer degree of accuracy for the purpose of locating an additional point on said edge, using said more accurate location of said located point as the starting point for location of the additional point.

10. The apparatus of claim 1, where said pixels of said pixel plane are associated in groups of pixels designated as "superpixels," where said superpixels extend N pixels in the direction perpendicular the scanlines and M pixels in the direction parallel the scanlines, where M is greater than 1 and where, said location parameter commands define a horizontal vector and said means for generating pixel data as outputs comprises:

a. means for identifying the location of a vector endpoint within a superpixel;

b. means for individually writing to memory the pixel value of individual pixels at the extremities of the horizontal vector that reside in superpixels for which at least one constituent pixel of a scanline lies off of the vector; and c. means for simultaneously writing to memory in one clock cycle the pixel value of all M pixels in the same superpixel for each superpixel that defines the vector.

11. The apparatus of claim 2, wherein said N first data processors further comprise means for receiving as inputs two sets of pixel data related to a given set of pixels and performing pixel arithmetic on said two sets of data to generate a third set of pixel data.

12. In an apparatus for generating and storing pixel representations for the display of graphic data in a two dimensional pixel plane defined by a plurality of contiguous, parallel display scanlines, each of which includes a plurality of contiguous pixels, having means for providing instructions in a first sequence of commands; and an image memory unit block for receiving said commands and for controlling a random access image memory into which pixel display data is written, wherein the scanlines are associated into N sets, where N is at least two, said image memory unit block having at least one image memory unit into which pixel display data is written, the invention comprising each said image memory unit having a serial and parallel data processing architecture comprising:

a. N first data processing means configured for parallel processing each first data processing means generating pixel data for pixels associated with those scanlines included in one only of said N sets of scanlines;
b. a second data processing means in a series configuration with the N first data processing means including:
  i. means for receiving commands of the first sequence;
  ii. a state controller:
    (1) for generating commands of a second sequence identifying parameters relating to locations on said pixel plane of said located shapes relating to color characteristics of said shapes;
    (2) means for passing to said N first data processors said commands of the second sequence; and
c. each of said N first data processors further comprising means for writing to memory pixel color data for pixels, of a scanline in the set associated with said N first data processors;

wherein each of the N first data processors writes to memory pixel data only with respect to pixels of a scanline in the set associated with that particular first data processor.

13. The apparatus of claim 12 wherein the second data processing means further comprises:
a. means for calculating parameters necessary to set up a single of said N first data processor to render the portion of a scanline that represents a selected portion of the located shape;
b. means for passing said parameters to said single first data processor; and
c. means for repeatedly activating said means for calculating and for passing said parameters until said second data processor has calculated and passed parameters necessary to render all of the selected portion of the located shape such that the second data processor sets up each of said N first data processors while the other of said N first data processors are calculating data necessary to render said located shape and each of the N first data processors can simultaneously calculate the data necessary to render a portion of the located shape represented by a scanline in the set associated with each of said N first data processors, which portion differs from the portions for which other first data processors calculate data, and to write the data to memory.

14. The apparatus of claim 12, wherein:
a. the second data processor further comprises:
  i. means for independently calculating parameters necessary to simultaneously set up all of the N first data processors to render a vector; and
  ii. means for independently passing said vector parameters to said N first data processors; and
b. each said N first data processors further comprise:
  i. means for independently identifying pixels that represent the vector and the locations of the pixels;
  ii. means for independently calculating the pixel data with respect to pixels that represent the vector;
  iii. means for independently determining, for each pixel that the first data processor identifies represents the vector, if each pixel is of a scanline associated with said first data processor; and
  iv. means for independently writing to memory pixel data only for pixels of a scanline associated with said first data processor.

15. In an apparatus for generating and storing pixel representations for the display of a triangular patch in a two dimensional pixel plane of a plurality of contiguous, parallel display scanlines, each of which includes a plurality of contiguous pixels; having means for providing instructions in the form of a first sequence of commands; and an image memory unit block for receiving said commands and for controlling a random access image memory, wherein the scanlines are associated into N sets, where N is at least two, said image memory unit block having at least one image memory unit, the invention comprising each said image memory unit having a serial and parallel data processing architecture comprising:
a. N first data processing means configured for parallel processing each data processing means generating pixel data for pixels associated with those scanlines included in one only of said N sets of scanlines;
b. a second data processing means in a series configuration with the N first data processing means and including:
  i. means for receiving commands of the first sequence;
  ii. a state controller:
    (1) for generating commands of a second sequence identifying parameters relating to locations on said pixel plane of said triangular patch and relating to color characteristics of said triangular patch;
    (2) for passing to said first data processors said commands of the second sequence; and
    (3) for setting up a single first data processor with said commands of the second sequence to render the portion of a scanline that represents a selected portion of the triangular patch; and
    (4) for repeatedly activating said means to set up a first data processor said second data processor has set up to render all of the triangular patch; and
c. said plurality of first data processors comprising:
  i. means for receiving as inputs commands of the second sequence, including the location parameter commands;
  ii. means for generating pixel data as outputs; and
  iii. means for writing the pixel data to the random access image memory;
d. the means of the second data processor to repeatedly activate the means to set up the first data processors further comprising means to set up each of said N first data processors while other of said N first data processors calculate data necessary to render said triangular patch such that each of the N first data processors simultaneously calculate the data necessary to render a portion of the triangular patch represented by a scanline in the set associated with each of said N first data processors and simultaneously write the data to memory such that each of the first data processors calculates and writes to memory pixel data only with respect to pixels of a scanline in the set associated with each particular first data processor.

16. In an apparatus for generating and storing pixel representations for the display of vectors on a two dimensional pixel plane of a plurality of contiguous, parallel display scanlines, each of which includes a plurality of contiguous pixels, having means for providing instructions in the form of a first sequence of commands; and an image memory unit block for receiving said commands and for controlling a random access image memory into which pixel display data is written, wherein the scanlines of the pixel plane are associated into N sets, where N is at least two, said image memory unit block having at least one image memory unit, the invention comprising each said image memory unit having a serial and parallel data processing architecture comprising:

a. N first data processing means, each data processing means generating pixel data for pixels associated with those scanlines included in one only of said N sets of scanlines;

b. a second data processing means in a series configuration with the N first data processing means and including:

i. means for receiving commands of the first sequence;

ii. a state controller:

(1) for generating commands of a second sequence identifying parameters relating to locations on said pixel plane of said vector and relating to color characteristics of said vectors; and (2) for passing to said first data processors said commands of the second sequence and means for simultaneously setting up all of the N first processors to render a vector; and c. each said first processors further comprising:

i. means for independently identifying pixels that represent the vector and the locations of the pixels;

ii. means for independently calculating the pixel data with respect to pixels that represent the vector;

iii. means for independently determining, for each pixel that the first data processor identifies represents the vector, if each pixel is of a scanline associated with said first data processor; and iv. means for independently writing to memory pixel data only for pixels of a scanline associated with said first data processor;

such that, each first data processor independently identifies, calculates data for and writes to memory pixel data representing a portion of the vector different from the portions of the vector for which the other first data processors calculate data for and write to memory.

17. In an apparatus for generating and storing pixel representations for the display of horizontal vectors on a two dimensional pixel plane of a plurality of contiguous, parallel display scanlines, each of which includes a plurality of contiguous pixels; having means for providing instructions in the form of a first sequence of commands; and an image memory unit block for receiving said commands and for controlling a random access image memory into which pixel display data is written, wherein said pixels of said pixel plane are associated in groups of pixels designated a "superpixels" where said superpixels extend M pixels in the direction parallel the scanlines, where M is greater than one, and said image memory unit block has at least one image memory unit, each said image memory unit comprising:

a. means for generating the pixel data to assign to a given pixel;

b. means for identifying the location of a vector endpoint within a superpixel;

c. means for receiving the pixel data from the means for generating pixel data and the location of a vector endpoint from said means for identifying said endpoint and for individually writing to memory the pixel data of individual pixels of the horizontal vector that reside in superpixels which contain a vector endpoint and at least one pixel that lies off the vector; and d. means for simultaneously writing to memory in one clock cycle the pixel value of all M pixels in the same superpixel repeatedly for each superpixel that lies on the vector.

18. In an apparatus for generating and storing pixel representations for the display of graphic data in a two dimensional pixel plane of a plurality of contiguous, parallel display scanlines, each of which includes a plurality of contiguous pixels, having means for providing instructions in the form of a first sequence of commands; and an image memory unit block for receiving said commands and for controlling a random access image memory into which pixel display data is written, said image memory unit block having at least one image memory unit, the invention comprising each said image memory unit comprising:

i. means for generating data representing a point location in a format defining a subpixel location to a first selected degree of accuracy and also to a second selected finer degree of accuracy;

ii. means for calculating pixel data for additional points using as an input the data representing a point location to the first degree of accuracy; and iii. means for calculating the location of additional points using as an input the data representing a point location to the second degree of accuracy.

19. A method of generating and storing pixel representations for the display of graphic data on a two dimensional pixel plane having a plurality of contiguous, parallel display scanlines, each of which includes a plurality of contiguous pixels, in accordance with instructions in the form of a first sequence of commands, the scanlines of the pixel plane being associated into N sets, where N is at least two, each scanline being a member of only one set comprising the steps of:

a. generating a second sequence of commands identifying parameters relating to locations on said pixel plane and to color characteristics of shapes defined by said first sequence of commands;

b. repeatedly performing the following steps i-iii simultaneously for N Scanlines, until pixel data for each pixel of each scanline representing each defined shape has been written to memory;

i. identifying in response to the second sequence the locations of pixels that represent the defined shape;

ii. using the second sequence of commands for calculating color parameters with respect to pixels of the scanline that represent shapes; and iii. writing to memory the calculated pixel data simultaneously for each of N Scanlines representing portions of the defined shape.

20. A method for generating and storing pixel representations for the display of a triangular patch on a two dimensional pixel plane of a plurality of contiguous, parallel display scanlines, each of which includes a plurality of contiguous pixels, in accordance with instructions in the form of a first sequence of commands, the scanlines of the pixel plane being associated into N sets, where N is at least two, each scanline being a member of only one set, comprising the steps of:

a. generating a second sequence of commands identifying parameters relating to locations on said pixel plane and to color characteristics of said triangular patch;

b. repeatedly performing the following steps i-iii simultaneously for N scanlines, until pixel data for each pixel in each scanline representing the triangular patch has been written to memory;

i. identifying in response to the second sequence of commands the locations of pixels that represent the triangular patch;

ii. using the second sequence of commands for calculating the parameters relating to color characteristics with respect to pixels of the scanline that represent the triangular patch; and iii. writing to memory the calculated pixel data simultaneously for each of N scanlines representing portions of the triangular patch.

21. A method for generating and storing pixel representations for the display of horizontal vectors on a two dimensional pixel plane of a plurality of contiguous, parallel display scanlines, each of which includes a plurality of contiguous pixels, in accordance with instructions in the form of a first sequence of commands wherein said pixels of said pixel plane are associated in groups of pixels designated as "superpixels" where said superpixels extend M pixels in the direction parallel the scanlines, where M is greater than one comprising the steps of:

a. identifying in response to the first sequence of commands parameters relating to locations on said pixel plane of said vector and relating to color characteristics of said vector;

b. identifying the location of a vector endpoint within a superpixel;

c. using as inputs the parameters relating to color characteristics and the locations of endpoints and individually writing to memory the pixel data of individual pixels of the horizontal vector that reside in superpixels which contain a vector endpoint and a pixel that lies off of the vector; and d. simultaneously writing to memory in one clock cycle the pixel value of all M pixels in the same superpixel, repeatedly for each superpixel that lies on the vector.

* * * * *

UNITED STATES PATENT AND TRADEMARK OFFICE
CERTIFICATE OF CORRECTION

PATENT NO. : 4,967,392

DATED : October 30, 1990

INVENTOR(S) : Ross G . Werner & Eric L. Ryherd

It is certified that error appears in the above—identified patent and that said Letters Patent is hereby corrected as shown below:

Column 31, line 9, after "green and", insert -- blue --; and

Column 32, line 11, after "position", delete "o", and insert -- on --.

Signed and Sealed this

Seventh Day of April, 1992

*Attest:*

HARRY F. MANBECK, JR.

*Attesting Officer*

*Commissioner of Patents and Trademarks*